US012664576B2

(12) United States Patent
Unnikrishnan et al.

(10) Patent No.: US 12,664,576 B2
(45) Date of Patent: Jun. 23, 2026

(54) SYSTEM, METHOD, AND NON-TRANSITORY COMPUTER-READABLE MEDIA USING GENERATIVE ARTIFICIAL INTELLIGENCE TO OPTIMIZE PRODUCT SEARCH QUERIES

(71) Applicant: ADOBE INC., San Jose, CA (US)

(72) Inventors: Soumya Unnikrishnan, Austin, TX (US); Michele Saad, Austin, TX (US); Bingxuan Liang, Kirkland, WA (US)

(73) Assignee: ADOBE INC., San Jos, CA (US)

( * ) Notice: Subject to any disclaimer, the term of this patent is extended or adjusted under 35 U.S.C. 154(b) by 272 days.

(21) Appl. No.: 18/336,815

(22) Filed: Jun. 16, 2023

(65) Prior Publication Data

US 2024/0420205 A1 Dec. 19, 2024

(51) Int. Cl.
 *G06Q 30/0601* (2023.01)
 *G06T 11/00* (2026.01)
(52) U.S. Cl.
 CPC .......... *G06Q 30/0625* (2013.01); *G06T 11/00* (2013.01)
(58) Field of Classification Search
 CPC ........................... G06Q 30/0625; G06T 11/00
 See application file for complete search history.

(56) References Cited

U.S. PATENT DOCUMENTS

| | | | | |
|---|---|---|---|---|
| 12,131,365 | B2 * | 10/2024 | Forsyth | G06Q 30/0643 |
| 2020/0142978 | A1 * | 5/2020 | Salokhe | G06F 18/24 |
| 2020/0184278 | A1 * | 6/2020 | Zadeh | G06N 3/044 |
| 2023/0206329 | A1 * | 6/2023 | Cella | G06Q 20/405 |

OTHER PUBLICATIONS

J. Cai, Z.-J. Zha, M. Wang, S. Zhang and Q. Tian, "An Attribute-Assisted Reranking Model for Web Image Search," in IEEE Transactions on Image Processing, vol. 24, No. 1, pp. 261-272, Jan. 2015, doi: 10.1109/TIP.2014.2372616. (Year: 2015).*

* cited by examiner

*Primary Examiner* — Jeffrey A. Smith
*Assistant Examiner* — Latasha D Ramphal
(74) *Attorney, Agent, or Firm* — Shook, Hardy & Bacon L.L.P.

(57) ABSTRACT

Methods and systems are provided for using generative AI to optimize product search queries. In embodiments described herein, product descriptions and product images for a plurality of products are obtained. A multi-modal style classification model classifies each product into a corresponding style of a plurality of styles based on the product's product description and product image. Relationships of each product to other products in the plurality of products are stored in a knowledge graph based on the corresponding style of each product and the corresponding product description of each product. An image is generated by a text-to-image diffusion model with a set of products of the plurality of products based on the relationships of each product of the plurality of products to other products in the plurality of products.

20 Claims, 17 Drawing Sheets

602 — A concept set: {room style, room type, furniture color, furniture type}

604 — Example: A contemporary style living room with a white sectional couch, a white rug, a brown coffee table...

802E

800E

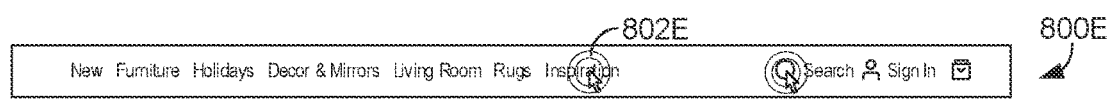

New   Furniture   Holidays   Decor & Mirrors   Living Room   Rugs   Inspiration          Search   Sign In

802F — Based on style

| CONTEMPORARY | TRADITIONAL | MODERN | ECLECTIC | MINIMALIST | TRANSITIONAL |
| MID-CENTURY | BOHEMIAN |

View more

804F — Based on your recent purchase                                   View more

802D

806F — Based on your moodboard                                        View more

808F — Based on your recent searches                                   View more 810F — Based on your location   ⦿ Current location                    View more

FIG. 8F

804H

We found 16 similar products

Sort by Latest

59" x 32" Freestanding Soaking Bathtub $2426.41

ADD TO CART

71" Extra Wide Jia Resin Freestanding Tub with Integral Drain and Overflow $926.41

ADD TO CART

Olivet 59 in. Acrylic Flat Bottom Double Ended Bathtub with Oil Rubbed Bronze Overflow and Drain included in White $726.41

ADD TO CART

Bevier 67" Freestanding Bathtub

Complementary Products     Customize

Similar Products

Often bought together

Sort by Latest

Clover Wood and Glass Bath Accessories, Toothbrush Holder, Acacia $20.00

ADD TO CART

Faux Hide Bath Mat $70.00

ADD TO CART

Modern Organic Bath Tray $36.00

ADD TO CART

Kaloh Bath Accessories

8041

Customize

Complementary Products

Similar Products

8061

8021

802J

Type of Bath

| | | | |
|---|---|---|---|
| Soaking | Whirlpool | Air | Air/Whirlpool |

Tub Size                    >

Installation Type           >

Drain Placement             >

Brand                       >

Apply

Similar Products    Complementary Products

Customize

802J

800J

1000

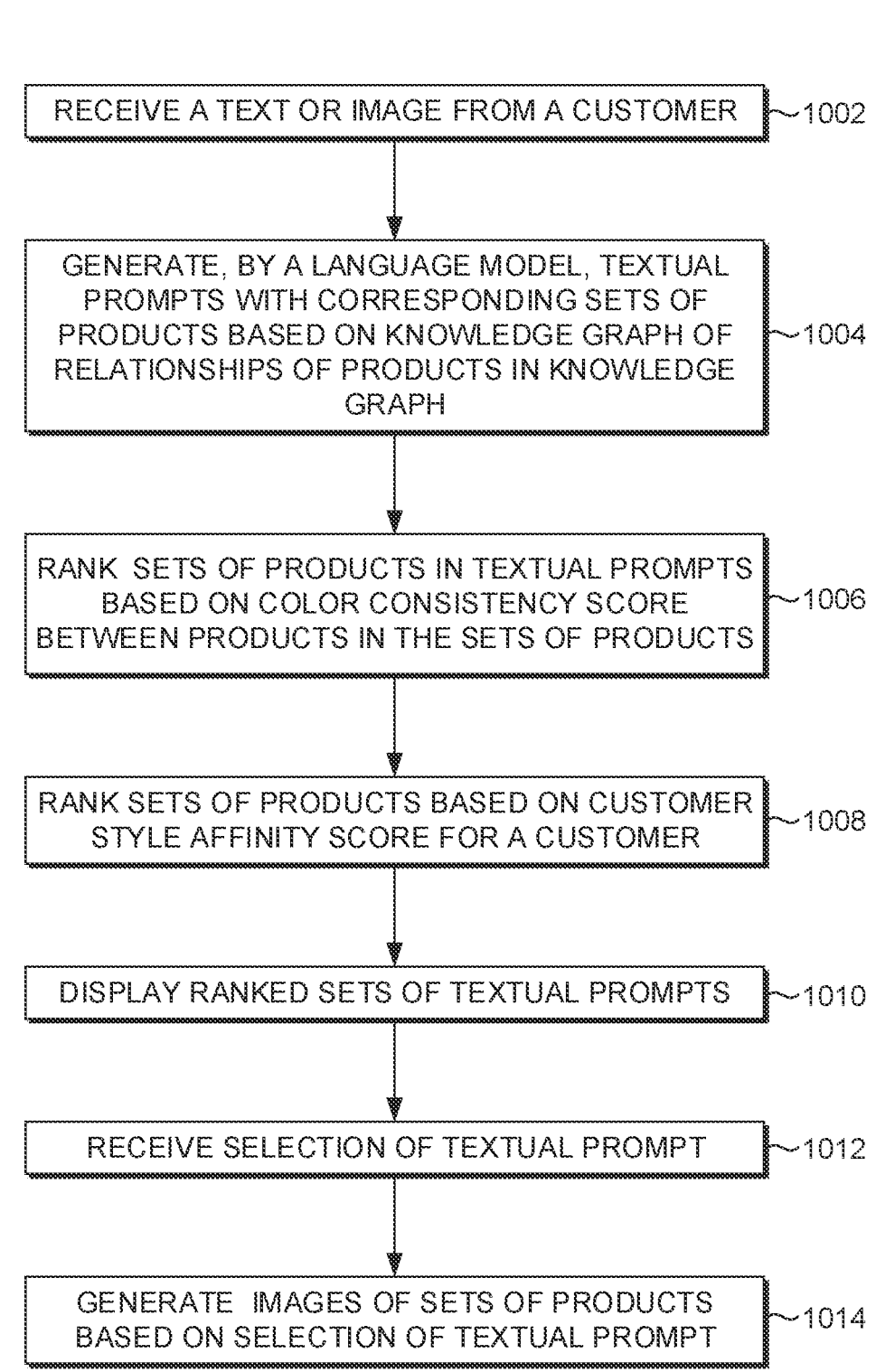

RECEIVE A TEXT OR IMAGE FROM A CUSTOMER ~1002

GENERATE, BY A LANGUAGE MODEL, TEXTUAL PROMPTS WITH CORRESPONDING SETS OF PRODUCTS BASED ON KNOWLEDGE GRAPH OF RELATIONSHIPS OF PRODUCTS IN KNOWLEDGE GRAPH ~1004

RANK SETS OF PRODUCTS IN TEXTUAL PROMPTS BASED ON COLOR CONSISTENCY SCORE BETWEEN PRODUCTS IN THE SETS OF PRODUCTS ~1006

RANK SETS OF PRODUCTS BASED ON CUSTOMER STYLE AFFINITY SCORE FOR A CUSTOMER ~1008

DISPLAY RANKED SETS OF TEXTUAL PROMPTS ~1010

RECEIVE SELECTION OF TEXTUAL PROMPT ~1012

GENERATE IMAGES OF SETS OF PRODUCTS BASED ON SELECTION OF TEXTUAL PROMPT ~1014

FIG. 10

SYSTEM, METHOD, AND NON-TRANSITORY COMPUTER-READABLE MEDIA USING GENERATIVE ARTIFICIAL INTELLIGENCE TO OPTIMIZE PRODUCT SEARCH QUERIES

BACKGROUND

Search and browse capabilities constitute some of the most fundamental aspects of an e-commerce solution. However, oftentimes, a customer will not be able to find the product within a specific scenario by conducting a search query in conventional implementations. For example, a customer may be looking for a couch, and, in particular, would like to view the couch in relation to a wood floor. However, the e-commerce website may not have any images of the couch in relation to the wood floor. Further, in conventional search query systems, the customer may not be able to formulate a good search query due to various factors, such as a language barrier hindering the searcher or if the search request is too complex. As a result, a customer may fail to find a specific product in a specific scenario and, as such, the e-commerce website may fail to achieve a conversion from the customer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Various aspects of the technology described herein are generally directed to systems, methods, and computer storage media for, among other things, using generative artificial intelligence (AI) to optimize product search queries. In this regard, embodiments described herein facilitate using generative AI to optimize product search queries by determining relationships between products for storage in a knowledge graph and using a generative language model trained on the relationships stored in the knowledge graph to generate textual prompts for a text-to-image diffusion model. Using a text-to-image diffusion model that takes into account the relationships of various products to generate images of products in the catalog, it is more likely search queries will result in optimal image search results and increased conversions associated with the products in the images will be obtained. As described herein, to determine relationships of products in a catalog, style classifications for each product and color consistency scores between products are determined. Such determinations can be generated using various machine learning models and/or clustering algorithms, some examples of which are described herein. In addition to style classifications for each product and the color consistency scores between products, various other relationships from product descriptions can be stored in the knowledge graph for use by the language model. Upon generating textual prompts by the language model, the sets of products in the textual prompts can be ranked and/or filtered based on the color consistency of the products and customer preferences before generating images of products through the text-to-image diffusion model based on the textual prompts. Further, in some cases, a user interface can be provided to allow a customer to modify the textual prompt generated by the language model and/or generate lists of similar and/or complementary products based on the relationships stored in the knowledge graph.

BRIEF DESCRIPTION OF THE DRAWINGS

FIGS. 8A-J provide exemplary schematic screenshots from a personal computing device showing aspects of example graphical user interfaces (GUIs), in accordance with embodiments of the present disclosure.

FIG. 10 is a process flow showing another method for using generative AI to optimize product search queries, in accordance with embodiments of the present disclosure.

DETAILED DESCRIPTION

Overview

Figure 1:
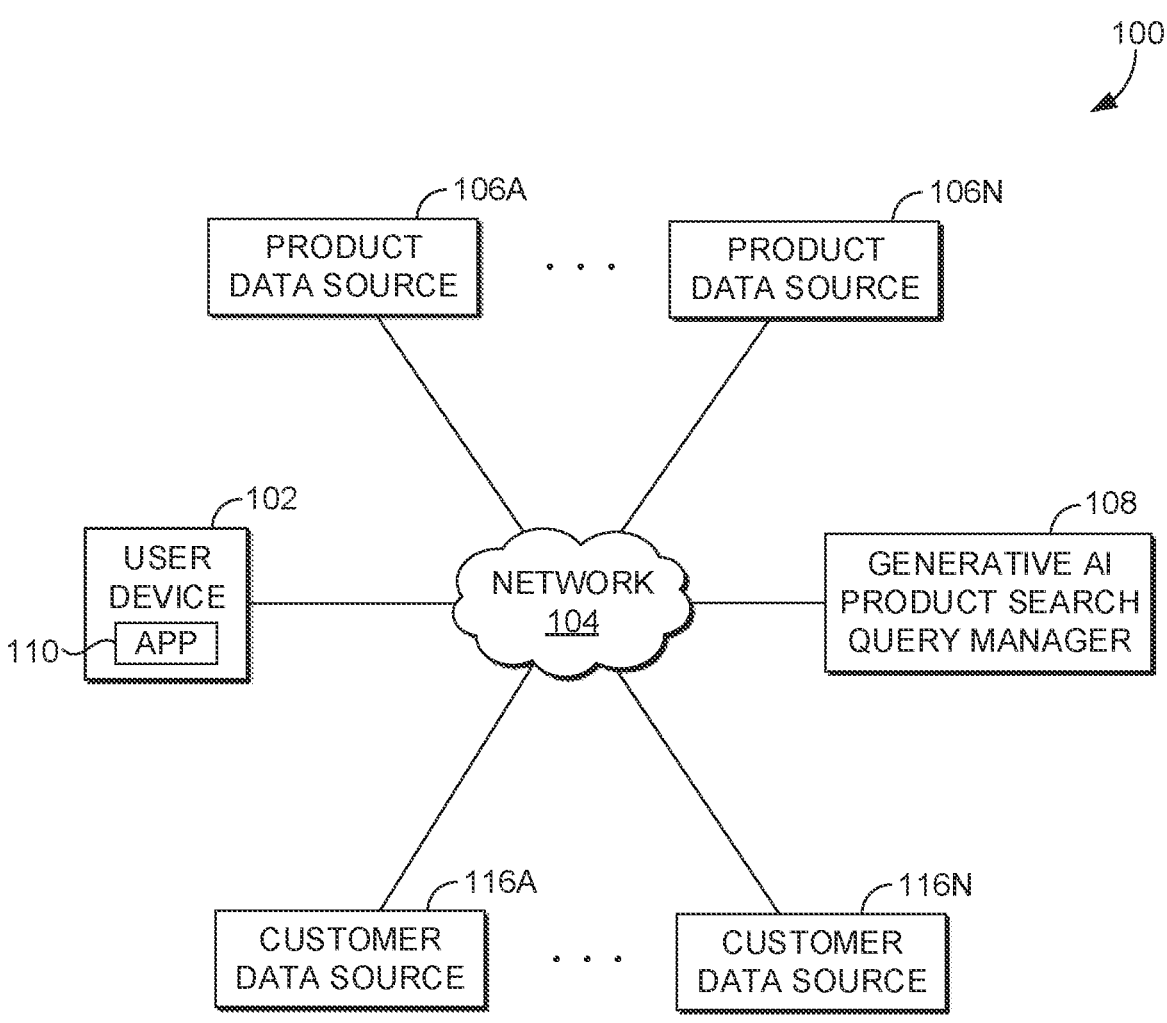
FIG. 1 depicts a diagram of an environment in which one or more embodiments of the present disclosure can be practiced, in accordance with various embodiments of the present disclosure.

Search and browse capabilities constitute some of the most fundamental aspects of an e-commerce solution. However, oftentimes, a customer will not be able to find the product within a specific scenario by conducting a search query in conventional implementations. For example, a customer may be looking for a couch, but would like to view the couch in relation to a wood floor. However, the e-commerce website may not have any images of the couch in relation to the wood floor. As another example, a customer may be searching for a couch, but would like to find a couch of a certain style, such as a contemporary couch. However, the search query systems for the e-commerce website may not have the specific description of the product with relation to the specific style that the customer is searching. Further, in conventional search query systems, the customer may not be able to formulate a good search query due to various factors, such as a language barrier hindering the searcher or if the search request is to complex. As a result, a customer may fail to find a specific product in a specific scenario and, as such, the e-commerce website may fail to achieve a conversion from the customer.

Currently, in order for a customer to search for a product, the customer must guess at the correct search terms, and the customer's search query may become increasingly complex in order to identify a product in a specific scenario. As a result of incorrect and/or increasingly complex search queries, the search results may not be what the customer is looking for as the incorrect and/or increasingly complex search queries search terms may not be available in the search results of the search engine. The customer must then perform multiple search queries in order to identify a product that the customer is searching for or the customer may need to perform additional search queries on other websites. Not only is generation of search queries time-consuming and inaccurate, but the search results may not reflect what the customer is searching for with respect to a specific aspect of a product. For example, conventional search results may provide an image of the product, but the customer would not be able to visualize how the product appears with other products in specific scenarios. The lack of visualization of the product with other products may lead to the customer failing to purchase the product (e.g., failing to convert) and may lead to the customer performing additional search queries for products with respect to the specific scenarios that the customer wishes to view the product.

Accordingly, unnecessary computing resources are utilized for customers performing search queries for products in conventional implementations. For example, computing and network resources are unnecessarily consumed to facilitate the search queries and accesses to products and product descriptions. For instance, computer input/output operations are unnecessarily increased in order for a customer to identify a product with respect to a specific scenario that the customer is searching. As one example, each time a search query is performed to identify a product in the specific scenario (e.g., a complex search query) that the customer is searching, the information of the search query must be located at a particular computer storage address of a storage device. The information must then be retrieved from the particular computer storage address of the storage device and presented to the customer. The customer must review the results of the search query to determine whether the search results reflect the product in the specific scenario that the customer is searching. As the customer must perform multiple search queries on multiple platforms to identify products in the specific scenarios that the customer is searching, computing resources are unnecessarily used to repeat the process for multiple iterations in order to submit new and/or different search queries, along with the subsequent accessing, presentation and review process of the information related to each iteration.

In this regard, the iterative process of searching for the product in a specific scenario and locating of the information by a search engine in order for the customer to review the search results is computationally expensive and increases latency. Further, when the information related to the product is located in a disk array and multiple iterations of the queries for the product in specific scenarios are issued, which is what occurs in existing technologies, there is unnecessary wear placed on the read/write head of the disk of the disk array. Further, the processing of the multiple iterations of search queries for products in specific scenarios decreases the throughput for a network, increases the network latency, and increases packet generation costs. In this regard, usage of network resources is multiplied due to the amount of queries that must be executed by a customer searching a product in a specific scenario, the subsequent access of the information from the results of the queries, as well as the generation of metadata in TCP/IP or any protocol used to generate the queries and subsequently access/presentation of the information.

As such, embodiments of the present disclosure are directed to using generative AI to optimize product search queries in an efficient and effective manner. In this regard, search query prompts and/or visual search query results can be efficiently and effectively generated for a customer in order to present one or more products in complex scenarios with other complimentary products, thereby increasing customer satisfaction and increasing conversions (e.g., a product purchase) of the one or more products and/or complimentary products.

Generally, and at a high level, embodiments described herein facilitate using generative AI to optimize product search queries by determining relationships between products for storage in a knowledge graph and using a generative language model trained on the relationships stored in the knowledge graph to generate textual prompts for a text-to-image diffusion model. Using a text-to-image diffusion model that takes into account the relationships of various products to generate images of products in the catalog, it is more likely search queries will result in optimal image search results and increased conversions associated with the products in the images will be obtained. As described herein, to determine relationships of products in a catalog, style classifications for each product and color consistency scores between products are determined. Such determinations can be generated using various machine learning models and/or clustering algorithms, some examples of which are described herein. In addition to style classifications for each product and the color consistency scores between products, various other relationships from product descriptions can be stored in the knowledge graph for use by the language model. Upon generating textual prompts by the language model, the sets of products in the textual prompts can be ranked and/or filtered based on the color consistency of the products and customer preferences before generating images with the sets of products through the text-to-image diffusion model using the textual prompts. Further, in some cases, a user interface can be provided to allow a customer to modify the textual prompt generated by the language model and/or generate lists of similar and/or complementary products based on the relationships stored in the knowledge graph.

In operation, a catalog of products is obtained. The catalog of products can be products offered on a website for customers to purchase. In embodiments, each product in the catalog of products includes a corresponding product description and product image. The product description can include various textual descriptions, such as the title, type of product, how the product is manufactured, or any other text describing the product.

In some embodiments, each product in the catalog of products are classified into a corresponding style. For example, with respect to the example of FIG. 3, the styles are "contemporary," "transitional, "modern," "traditional," "eclectic," "minimalist," "mid-century," and "bohemian." In embodiments, a multi-modal style classification model is trained to output a style of unseen, input products. For example, the multi-modal style classification model can be trained based on a training set of products. In one example, with respect to the example of FIG. 3, the multi-modal style classification model is trained based on a training set of home décor products with the corresponding title, descrip- tion, and images of the training set of home décor products along with their "style" tags (e.g., labels) labelled by interior designers and/or any person or algorithm that is capable of labelling the products with style tags. After the multi-modal style classification model is trained in the example of FIG. 3, the unseen product (e.g., the product description 302A, product title 302B, and product image 302C of the unseen product) can be input into the multi-modal style classifica- tion model to output the corresponding style of the previ- ously unseen product.

In some embodiments, the color palette of each product is extracted from the product image(s) of each product. The color palette extracted for each product can be any number of colors of the product and in any form, such as vectors corresponding to the colors of the color palette extracted from the product image(s) of the product. For example, with respect to the example of FIG. 6, each product includes the three main colors (e.g., most prominent colors) of each product represented by the respective hexadecimal color code of the color.

Relationships of products are stored in a knowledge graph. As a specific example of relationships that can be stored in a knowledge graph, with respect to the example of FIG. 6, the knowledge graph captures relationships, such as (a) room type (e.g., a subset of complimentary products) and style associations, (b) room type (e.g., a subset of compli- mentary products) and furniture (e.g., a type of product) associations, (c) furniture (e.g., a type of product) and color associations, and (d) color consistency scores between two products (e.g., as shown by example stock keeping units (SKUs) of each product) in the catalog of products.

Figures 8A, 8B, 8C, 8D:
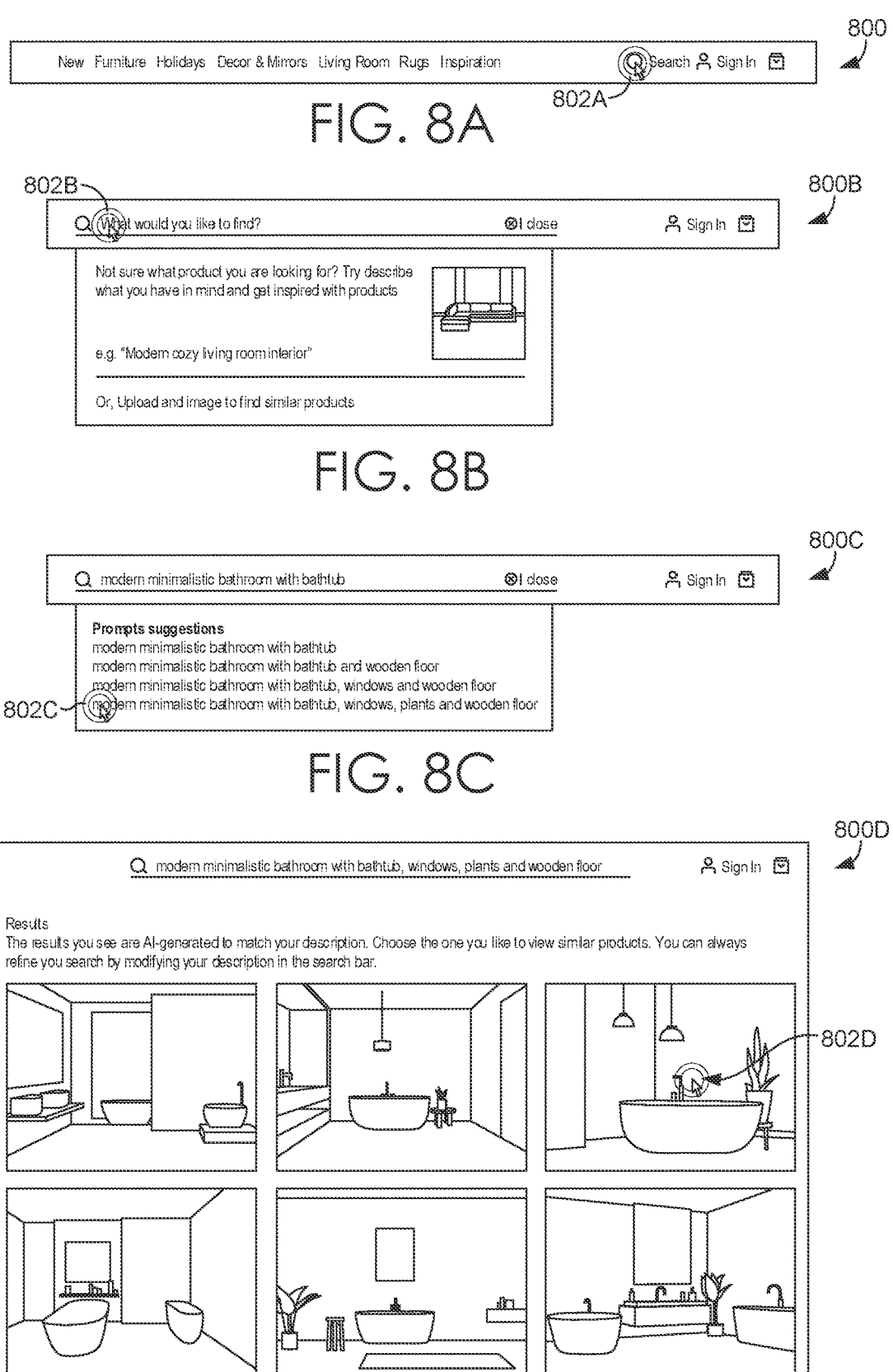

In one example, relationships regarding the colors and/or color palettes of products can be stored in the knowledge graph. For example, with respect to the example of FIG. 6, the relationship of each product (e.g., each SKU) to its corresponding color palette is stored in the knowledge graph. In another example, relationships regarding the style of products can be stored in the knowledge graph. For example, with respect to the example of FIG. 6, the rela- tionship of each product (e.g., each SKU) to its correspond- ing style (e.g., contemporary) is stored in the knowledge graph. Also with respect to the example of FIG. 6, the relationship between the style (e.g., "contemporary") and the subset of complimentary products (e.g., "living room") can be stored in the knowledge graph. In another example, relationships regarding product type of products can be stored in the knowledge graph. For example, as described with respect to the example of FIG. 6, the relationship of the product (e.g., each SKU) to its corresponding type of product (e.g., sectional couch, rug, or coffee table). In another example, relationships regarding product attributes of products can be stored in the knowledge graph. For example, with respect to the example of FIG. 8J, the product attributes of the product type (e.g., bathtub) are "type of bath," "tub size," "installation type," "drain placement," and "brand" and can be stored in the knowledge graph with respect to other products of the same product type. In another example, relationships regarding subsets of comple- mentary products can be stored in the knowledge graph. For example, with respect to the example of FIG. 6, the rela- tionship between products types (e.g., "coffee table," a "rug," and a "sectional couch") and the subset of complimentary products (e.g., "living room") is stored in the knowledge graph. As can be understood, any relationships regarding the products of the product catalog can be stored in the knowledge graph.

A language model generates a textual prompt with sets of products based on the knowledge graph. In embodiments, the language model can be trained based on the relationships stored in the knowledge graph to generate textual prompts in human-readable text for display to an end user (e.g., a customer). For example, with respect to the example of FIG. 7 and example knowledge graph of FIG. 6, a pre-trained language generation model, leverages the relationships stored in the knowledge graph, such as room type, room style, furniture type and furniture color, to generate logical and human readable textual prompts as output for each combination of room type, room style, furniture type, and/or furniture color (e.g., the example of FIG. 8B, language model generates the textual prompt of "modern minimalistic bathroom with bathtub, windows, plants, and wooden floor"). In this regard, the textual prompt generated by the language model can be utilized to guide the output of the text-to-image diffusion model as the language model is trained based on the relationships between products as stored in the knowledge graph.

Further, in some embodiments, any input (e.g., text or images, customer data, etc.) can be utilized to guide the output textual prompt of the language model. For example, with respect to the example of FIGS. 8B and 8C, the customer may begin by inputting text and/or image(s) (e.g., the customer inputs "modern minimalistic bathroom with bathtub") into the search query and the language model generates textual prompts (e.g., "modern minimalistic bath- room with bathtub and wooden floor," "modern minimalistic bathroom with bathtub, windows, plants, and wooden floor," etc.) based on the input from the customer. In some embodi- ments, an image-to-text diffusion model can generate text from input images (e.g., captions describing the input image) in order to input images as search queries to guide the language model in generating textual prompts. In other embodiments, the language model can begin by generating a textual prompt, the customer can refine the textual prompt through input text or images, and the language model can refine the textual prompt based on the customer's input.

In some embodiments, with respect to the example shown in FIG. 8F, the language model can generate the textual prompt based on a selected style, recent purchases, mood- boards, recent searches, the customer's locations, the cus- tomer style affinity score, etc. In this regard, customer data can be used to generate personalized textual prompts by the language model. In some embodiments, customer data can be used to determine products affinity scores, complemen- tary product affinity scores, color affinity scores, and other scores to generate personalized textual prompts by the language model.

In this regard, an image (or images) of a set of products (or sets of products) are generated through a text-to-image diffusion model based on the textual prompt generated by the language model. For example, with respect to the example of FIG. 7, the text-to-image diffusion model gen- erates three (3) images of different sets of products, where each set of products includes a number of products from the catalog of products, based on the textual prompt generated by a language model. Although three (3) images of different sets of products are shown, any amount of images with any amount of sets of products, where each set of products includes any amount of products are within the scope of the present disclosure. As another example, with respect to the example of FIG. 8D, six (6) images of different sets of products are generated by the text-to-image diffusion model based on the textual prompt generated by a language model.

In some embodiments, the textual prompts generated by the language model and/or images generated by the text-to-image diffusion model with sets of products are ranked according to the color consistency score between the products in each of the sets of products. The color consistency scoring model compares the color palettes of products in order to generate a score representing the consistency of the color palettes. For example, with respect to the example of FIG. 4, the color consistency scoring model can extract the color palette from product images of two or more products to generate the color palette vector for each product. The color consistency scoring model can then compute the Euclidian distance between the color palette vectors of the two or more products to compute the color consistency score between the two or more products.

In embodiments, if the color consistency score between the two or more products is higher (e.g., the Euclidian distance between the color palette vectors of the two products are lower), the textual prompt generated by the language model and/or images generated by the text-to-image diffusion model with the two or more products can be ranked higher in the textual prompts generated by the language model and/or images generated by the text-to-image diffusion model in response to the search query (e.g., the textual prompt). Further, in some embodiments, if the color consistency score between the two or more products is lower (e.g., the Euclidian distance between the color palette vectors of the two products are higher), the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt).

In some embodiments, the textual prompts generated by the language model and/or images generated by the text-to-image diffusion model with sets of products are ranked according to customer style affinity scores for customer. The customer style affinity scoring model is trained to generate style scores for a customer based on input customer data. For example, with respect to the example of FIG. 5, the multi-modal style classification model can be utilized to classify the customer based on the customer data and the style affinity scoring model can generate scores for the customer based on the classification output by the multi-modal style classification model. The customer data used to generate the customer style affinity score for a customer can be based on customer data for the customer. For example, with respect to the example of FIG. 5, customer data includes the customer's recent design prompts (e.g., search history), recent purchases, and saved moodboards (e.g., through an API connecting an external moodboard such as Pinterest®, an internal moodboard saved on the website where the customer is performing its search queries, or etc.).

In embodiments, if a style score for the textual prompt generated by the language model and/or images generated by the text-to-image diffusion model is closer to the customer style affinity score for customer, the textual prompt generated by the language model and/or images generated by the text-to-image diffusion model can be ranked higher in the textual prompts generated by the language model and/or images generated by the text-to-image diffusion model in response to the search query (e.g., the textual prompt).

Further, in some embodiments, if a style score for the textual prompt generated by the language model and/or images generated by the text-to-image diffusion model is further away from the customer style affinity score for customer, the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt).

In some embodiments, the customer style affinity score is updated each time a customer enters the website to perform the search query or at automated intervals in order to capture the evolving style affinities of the customer. In some embodiments, after the language model generates a textual prompt with sets of products based on the knowledge graph, the sets of products are ranked based on specific customer data sources of the customer data. For example, with respect to the example shown in FIG. 8F, sets of products are ranked based on a selected style, recent purchases, moodboards, recent searches, the customer's locations, etc.

In this regard, an image (or images) of a set of products (or sets of products) are generated through a text-to-image diffusion model based on the ranked textual prompts generated by the language model.

In some embodiments, a GUI can be presented to the customer to interact with the textual prompts generated by the language model during the search query. For example, with respect to the example shown in FIG. 8A-8D, exemplary schematic screen display 800A allows a customer to select a search option (e.g., 802A). Exemplary schematic screen display 800B presents a search query bar (e.g., 802B) in the GUI where a customer can enter text of the search query. As the customer enters text (e.g., "modern minimalistic bathroom with bathtub") in the search query bar of exemplary schematic screen display 800C, the language model generates a number of textual prompts and a customer can select one of the textual prompts (e.g., 802C). In exemplary schematic screen display 800D, a number of images with different sets of products are generated by the text-to-image diffusion model and the customer can select one of the images (e.g., 802D). In another example, with respect to the example shown in FIG. 8E-8F, exemplary schematic screen display 800E allows a customer to select an element (e.g., inspiration 802E). Exemplary schematic screen display 800F displays a number of images generated by the text-to-image diffusion model based on textual prompts generated by the language model with respect to a selected style (e.g., 802F), recent purchases (e.g., 804F), moodboards (e.g., 806F), recent searches (e.g., 808F), and/or the customer's locations (e.g., 810F). The customer can then select an image (e.g., 812F) that the customer would like to view in further detail.

Figure 8G:
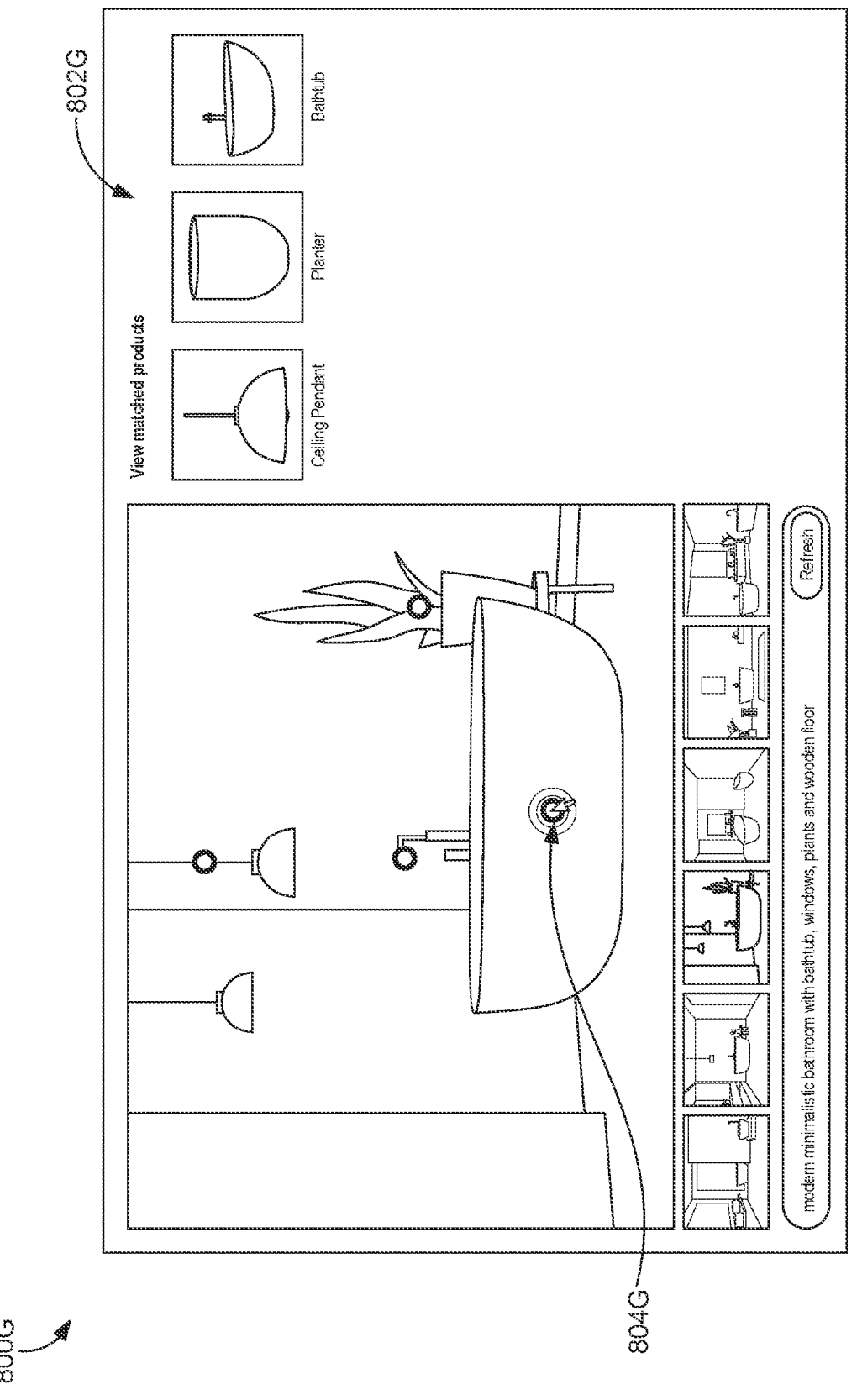

In embodiments, following selection of the image (e.g., 802D or 812F), in exemplary schematic screen display 800G of FIG. 8G, the image is displayed to the end user (e.g., a customer) through the GUI. The products of the set of products of the image are displayed through the GUI (e.g., 802G). As shown in the example, the set of products includes the ceiling pendant, planter, and bathtub. The customer can select the one of the products of the set of products for display in the GUI (e.g., the bathtub). In embodiments, the customer can then indicate (e.g., select or hover over) the bathtub (e.g., 804G) for additional actions.

Figure 8I:
Figure 8J:

In embodiments, as shown in exemplary schematic screen display 800H, 800I, and 800J of FIGS. 8G-8I, the GUI can include a number of elements indicating types of requests, such as a request for complementary products, a request for similar products, and/or a request to customize product attributes of the product. In embodiments, upon selection of similar products (802H) in exemplary schematic screen display 800H and the indication of a product in the image (e.g., 804G in FIG. 8G), a list of similar products related to the product type of the product (e.g., 804H) can be generated based on relationships stored in the knowledge graph. For example, 804H shows a number of similar bathtubs (e.g., product type) of a similar color and style in response to the selection of similar products and indication of the bathtub of the set of product of the image. In embodiments, the customer can then select items from the list for review, purchase, and/or perform further requests.

In embodiments, upon selection of complementary products (806H and 802I) in exemplary schematic screen display 800I and the indication of a product in the image (e.g., 804G in FIG. 8G), a list of complementary products (e.g., 804I) can be generated based on relationships stored in the knowledge graph. For example, 804I shows a number of complementary products (e.g., clover wood and glass bath accessories, faux hide bath mat, etc.) of a similar style and/or color in response to the selection of complementary products and indication of the bathtub of the set of product of the image. In embodiments, the customer can then select items from the list for review, purchase, and/or perform further requests.

In embodiments, upon selection of "customize" (806I and 802J) in exemplary schematic screen display 800J and the indication of a product in the image (e.g., 804G in FIG. 8G), a list of product attributes for the product (e.g., 804J) can be generated based on relationships stored in the knowledge graph. For example, with respect to the example of FIG. 8J, the product attributes 804J of the product type (e.g., bathtub) are "type of bath," "tub size," "installation type," "drain placement," and "brand" and can be stored in the knowledge graph with respect to other products of the same product type. In embodiments, the customer can customize the product attributes (e.g., 804J). Based on the changes to the product attributes (e.g., 804J), a list of products with the corresponding different product attributes can be generated based on relationships stored in the knowledge graph. In embodiments, the customer can then select items from the list for review, purchase, and/or perform further requests.

Advantageously, efficiencies of computing and network resources can be enhanced using implementations described herein. In particular, the generating of images of sets of products based on textual prompts generated by a language model that takes into account relationships of the products stored in a knowledge graph provides for a more efficient use of computing resources (e.g., higher throughput and reduced latency for a network, less packet generation costs, etc.) than conventional methods of searching for products. Further, the technology described herein enables a customer searching for a product in a specific scenario to be presented with the product in the specific scenario causing the customer to be more likely to purchase the product, which provides a more efficient use of computing resources by reducing the usage of network resources for performing unnecessary search query iterations. In this regard, the technology described herein enables a customer searching for a product in a specific scenario to be able to efficiently and effectively discover products in specific scenarios with minimal search queries, thereby reducing unnecessary computing resources used to process multiple search query iterations. The technology described herein results in less search queries over a computer network, which results in higher throughput, reduced latency and less packet generation costs as fewer packets are sent over a network. Therefore, the technology described herein conserves network resources.

Various terms are used throughout the description of embodiments provided herein. A brief overview of such terms and phrases is provided here for ease of understanding, but more details of these terms and phrases is provided throughout.

A "product representation" refers to a representation of a product, such as a product description and/or product image. A "product description" refers to a textual description of a product. A "product image" refers to an image of a product. The product description can include various textual descriptions, such as the title, type of product, how the product is manufactured, or any other text describing the product. The product descriptions and product images may be stored in a database, which may be referred to as a catalog, set, or listing of product descriptions.

A "product type" refers to the corresponding type of the product. For example, as described with respect to the example of FIG. 6, the type of product may be a couch, a rug, or a coffee table. As such, a product type generally includes some category, classification, or description describing the product.

A "product attribute" refers to a specific detail or characteristic regarding the product, such as the color of the product as listed in the catalog or various other attributes of the product. For example, with respect to the example of FIG. 8J, the product attributes of the bathtub are "type of bath," "tub size," "installation type," "drain placement," and "brand."

A "complimentary product" refers to a product that is associated with a primary or particular product. For example, with respect to the example of FIG. 8G, the complimentary products are the "ceiling pendant" and the "planter" which are associated with the primary product, the "bathtub," in the scenario described with respect to the textual prompt.

A "subset of complimentary products" refers to a grouping of products, or a set of complimentary products, that are associated with each other. For example, with respect to the example of FIG. 6, the subset of complimentary products is the "living room." The products within the subset of complimentary products in the example of the "living room," includes a "coffee table," a "rug," and a "sectional couch."

A "color palette" refers to the collection of colors of the product. The color palette can include any number of colors of the product and can be represented in any form. For example, with respect to the example of FIG. 6, each product includes the three main colors (e.g., most prominent colors) of each product represented by the respective hexadecimal color code of the color. As an example, the color palette can be input as a vector into the color consistency scoring model using the respective hexadecimal color code of each color.

A "color consistency scoring model" refers to a model that compares the color palettes of products in order to generate a score representing the consistency of the color palettes. For example, with respect to the example of FIG. 4, the color consistency scoring model can extract the color palette from images of two products to generate the color palette vector for each product. The color consistency scoring model can then compute the Euclidian distance between the color palette vectors of the two products to compute the color consistency score between the two products.

A "language model" generally refers to an AI system trained to understand and generate human-readable text. For example, the language model can be trained based on the relationships stored in the knowledge graph to generate textual prompts in human-readable text for display to an end user (e.g., a customer).

A "textual prompt" refers to text generated by a language model. For example, by generating a textual prompt by the language model, the generated textual prompt can be utilized to guide the output of the text-to-image diffusion model.

A "multi-modal style classification model" refers to a deep learning model trained to output a style of unseen, input products based on a corresponding product description and/or product image. For example, the multi-modal style classification model can be trained based on a training set of products. For example, with respect to the example of FIG. 3, the multi-modal style classification model is trained based on a training set of home décor products with the corresponding title, description, and images of the training set of home décor products along with their "style" tags (e.g., labels) labelled by interior designers and/or any person or algorithm that is capable of labelling the products with style tags. After the multi-modal style classification model is trained in the example of FIG. 3, the unseen product (e.g., the product description 302A, product title 302B, and product image 302C of the unseen product) can be input into the multi-modal style classification model to output the corresponding style of the previously unseen product.

A "style" refers to distinctive visual and/or artistic characteristics that are consistent throughout a design. For example, with respect to the example of FIG. 3, the styles are "contemporary," "transitional, "modern," "traditional," "eclectic," "minimalist," "mid-century," and "bohemian."

A "knowledge graph" refers to a structured representation of relationships between various entities. The knowledge graph organizes information where nodes represent entities and edges represent relationships between entities. For example, with respect to the example of FIG. 6, the knowledge graph captures relationships, such as (a) room type and style associations, (b) room type and furniture associations, (c) furniture and color associations and (d) color consistency scores between two products (SKUs) in the catalog of products.

A "text-to-image diffusion model" refers to an AI system that generates images based on text (e.g., textual prompts). Text-to-image diffusion models are trained using deep learning techniques to learn correlations between natural language and images. For example, with respect to the example of FIG. 7, the text-to-image diffusion model is generates an image with the images of products from the catalog based on the textual prompt generated by a language model.

"Customer data" refers to any data regarding a customer or customers. Customer data within a dataset may include, by way of example and not limitation, data that is sensed or determined from one or more sensors, such as location information of mobile device(s), smartphone data (such as phone state, charging data, date/time, or other information derived from a smartphone), activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events) including activity that occurs over more than one device, user history, session logs, application data, contacts data, calendar and schedule data, notification data, social network data, news (including popular or trending items on search engines or social networks), online gaming data, ecommerce activity, sports data, health data, and nearly any other source of data that may be used to identify the customer. For example, with respect to the example of FIG. 5, customer data includes the customer's recent design prompts (e.g., search history), recent purchases, and saved moodboards (e.g., through an Application Programming Interface (API) connecting an external moodboard such as Pinterest®, an internal moodboard saved on the website where the customer is performing its search queries, or etc.).

A "moodboard" refers to a collection of images assembled as a visual reference or inspiration for a design. The moodboard can be stored through an external moodboard service (e.g., Pinterest®) or stored directly by the website where the customer is performing its search queries (e.g., such as the Example GUIs provided in FIGS. 8A-J).

A "style affinity scoring model" refers to an AI model trained to generate style scores for a customer based on input customer data. For example, with respect to the example of FIG. 5, the multi-modal style classification model can be utilized to classify the customer based on the customer data and the style affinity scoring model can generate scores for the customer based on the classification output by the multi-modal style classification model.

Overview of Exemplary Environments of Using Generative AI to Optimize Product Search Queries Turning to FIG. 1, FIG. 1 depicts an example configuration of an operating environment in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory as further described with reference to FIG. 12.

It should be understood that operating environment 100 shown in FIG. 1 is an example of one suitable operating environment. Among other components not shown, operating environment 100 includes a user device 102, network 104, product data sources 106A-N, customer data sources 116A-N, and generative AI product search query manager 108. Each of the components shown in FIG. 1 can be implemented via any type of computing device, such as one or more of computing device 1200 described in connection to FIG. 12, for example.

These components can communicate with each other via network 104, which can be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, one or more private networks, one or more cellular networks, one or more peer-to-peer (P2P) networks, one or more mobile networks, or a combination of networks. Where network 104 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 104 is not described in significant detail.

It should be understood that any number of user devices, servers, and other components can be employed within operating environment 100 within the scope of the present disclosure. Each can comprise a single device or multiple devices cooperating in a distributed environment.

User device 102 can be any type of computing device capable of being operated by an individual(s) (e.g., a customer or a business). For example, in some implementations, such devices are the type of computing device described in relation to FIG. 12. By way of example and not limitation, user devices can be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user device can include one or more processors, and one or more computer-readable media. The computer-readable media may include computer-readable instructions executable by the one or more processors. The instructions may be embodied by one or more applications, such as application 110 shown in FIG. 1. Application 110 is referred to as single applications for simplicity, but its functionality can be embodied by one or more applications in practice.

User device 102 can be a client device on a client-side of operating environment 100, while generative AI product search query manager 108 can be on a server-side of operating environment 100. Generative AI product search query manager 108 may comprise server-side software designed to work in conjunction with client-side software on user device 102 so as to implement any combination of the features and functionalities discussed in the present disclosure. An example of such client-side software is application 110 on user device 102. This division of operating environment 100 is provided to illustrate one example of a suitable environment, and it is noted there is no requirement for each implementation that any combination of user device 102 or generative AI product search query manager 108 to remain as separate entities.

Application 110 operating on user device 102 can generally be any application capable of facilitating the exchange of information between the user device(s) and the generative AI product search query manager 108 in carrying out generating textual prompts, images with products, and/or related products to optimize search queries for products. In some implementations, the application(s) comprises a web application, which can run in a web browser, and could be hosted at least partially on the server-side of environment 100. In addition, or instead, the application(s) can comprise a dedicated application. In some cases, the application is integrated into the operating system (e.g., as a service). It is therefore contemplated herein that "application" be interpreted broadly. In embodiments, user interactions with application 110 can be monitored (e.g., via a server) to identify interactions of a user with products and/or search queries for products. For example, user interactions with application 110 can be monitored, including selecting or clicking on a particular product, electronically purchasing a particular product, navigating to a particular website, adding a product and/or image to moodboard (e.g., an external moodboard or an internal moodboard), and the like.

In accordance with embodiments herein, the application 110 can facilitate using generative AI to optimize product search queries in an efficient and effective manner. In operation, a user can search for products (e.g., a user search for products to purchase on an e-commerce website) via a GUI provided via the application 110. The generative AI product search query manager 108 can facilitate using generative AI to optimize product search queries through relationships between products stored in a knowledge graph and using a generative language model trained on the relationships stored in the knowledge graph to generate textual prompts for a text-to-image diffusion model to generate images of sets of products. Further, the generative AI product search query manager 108 can facilitate filtering and/or ranking the sets of products in the textual prompts based on the color consistency of the products and the style of the customer determined from customer data before presenting ranked textual prompts and/or ranked images generated from the textual prompts to the customer. Further, the generative AI product search query manager 108 can facilitate presenting through a user interface of application 110 of user device 102 to allow a customer to modify the textual prompt generated by the language model and/or generate lists of similar and/or complementary products based on the relationships stored in the knowledge graph.

In this regard, the generative AI product search query manager 108 provides textual prompts and/or images generated from the textual prompts for the specific customer to application 110 of the user device 102. The textual prompts and/or images generated from the textual prompts can be displayed via a display screen of the user device 102. The textual prompts and/or images generated from the textual prompts can be presented in any manner.

In operation, the generative AI product search query manager 108 can obtain user data from user device 102 (e.g., the customer's customer data), customer data from customer data sources 116a-116n, and product data (e.g., product names, product prices, product descriptions, product images, etc.) from product data sources 106a-106n. Data sources 106a-106n and 116a-116n may be any type of source providing data (e.g., product data and customer data). Generally, the generative AI product search query manager 108 receives data from any number of devices. As such, the generative AI product search query manager 108 can identify and/or collect data from various user devices, such as user device 102, and sources, such as data sources 106a-106n and 116a-116n. In this regard, the generative AI product search query manager 108 can retrieve or receive data collected or identified at various components, or sensors associated there with.

As described, in some cases, the generative AI product search query manager 108 can retrieve or receive customer data from the user device 102 and customer data sources 116a-116n. Customer data within a dataset may include, by way of example and not limitation, data that is sensed or determined from one or more sensors, such as location information of mobile device(s), smartphone data (such as phone state, charging data, date/time, or other information derived from a smartphone), activity information (for example: app usage; online activity; searches; browsing certain types of webpages; listening to music; taking pictures; voice data such as automatic speech recognition; activity logs; communications data including calls, texts, instant messages, and emails; website posts; other user data associated with communication events) including activity that occurs over more than one device, user history, session logs, application data, contacts data, calendar and schedule data, notification data, social network data, news (including popular or trending items on search engines or social networks), online gaming data, ecommerce activity, sports data, health data, and nearly any other source of data that may be used to identify the customer. For example, with respect to the example of FIG. 5, customer data includes the customer's recent design prompts (e.g., search history), recent purchases, and saved moodboards (e.g., through an API connecting an external moodboard such as Pinterest®, an internal moodboard saved on the website where the customer is performing its search queries, or etc.).

Additionally or alternatively, the generative AI product search query manager 108 can retrieve or receive product data from product data sources 106a-106n. By way of example and not limitation, product data within a dataset may include data that is sensed or determined from one or more sensors, such as product images, product names, product prices, product descriptions, product titles, and nearly any other source of data that may be used to identify the product or information about the product, as described herein.

Such customer data and product data can be initially collected at remote locations or systems and transmitted to a data store for access by generative AI product search query manager 108. In accordance with embodiments described herein, customer and product data collection may occur at data sources 106a-106n and 116a-116n, respectively. In some cases, data sources 106a-106n and 116a-116n, or portion thereof, may be client devices, that is, computing devices operated by businesses (e.g., product listings or catalogs, etc.) or customers (e.g., online product searchers or viewers, online product customers, etc.), respectively, for example. As such, client devices, or components associated therewith, can be used to collect various types of customer and product data. For example, in some embodiments, customer data may be obtained and collected at a client device operated by a customer via one or more sensors, which may be on or associated with one or more client devices and/or other computing devices. As another example, in some embodiments, customer data or product data may be obtained and collected at an e-commerce website being visited by a customer via one or more sensors, which may be on or associated with one or more client devices and/or other computing devices. As used herein, a sensor may include a function, routine, component, or combination thereof for sensing, detecting, or otherwise obtaining information, such as customer and product data, and may be embodied as hardware, software, or both.

In addition or in the alternative to data sources 106a-106n and 116a-116n including client devices, data sources 106a-106n and 116a-116n may include servers, data stores, or other components that collect customer or product data, for example, from client devices associated with customers or e-commerce websites. For example, in interacting with a client device, datasets may be captured at data sources 106a-106n and 116a-116n and, thereafter, such customer data can be provided to generative AI product search query manager 108 for storage. As another example, in interacting with an e-commerce website, datasets may be captured at data sources 106a-106n and 116a-116n and, thereafter, such product or customer data can be provided to generative AI product search query manager 108 for storage. Product and customer data may additionally or alternatively be obtained from an external server, for example, that collects product or customer data. Product and customer data can be obtained at a data source periodically or in an ongoing manner (or at any time) and provided to the generative AI product search query manager 108 to facilitate using generative AI to optimize product search queries. Product and customer data can be manually input into the generative AI product search query manager 108. For example, a catalog of previously-labeled products may be manually input into the generative AI product search query manager 108 in order to train a machine learning model (e.g., multi-modal style classification model 204) operating at the generative AI product search query manager 108.

Generative AI product search query manager 108 can be or include a server, including one or more processors, and one or more computer-readable media. The computer-readable media includes computer-readable instructions executable by the one or more processors. The instructions can optionally implement one or more components of generative AI product search query manager 108, described in additional detail below with respect to generative AI product search query manager 202 of FIG. 2.

At a high level, generative AI product search query manager 108 performs various functionality to facilitate efficient and effective use of generative AI to optimize product search query results, such as determining relationships between products, storing the relationships in a knowledge graph, and using a generative language model trained on the relationships stored in the knowledge graph to generate textual prompts for a text-to-image diffusion model to generate images of sets of products. Further, the generative AI product search query manager 108 can facilitate filtering and/or ranking the sets of products in the textual prompts based on the color consistency of the products and the style of the customer determined from customer data before presenting ranked textual prompts and/or ranked images generated from the textual prompts to the customer. Further, the generative AI product search query manager 108 can facilitate presenting through a user interface of application 110 of user device 102 to allow a customer to modify the textual prompt generated by the language model and/or generate lists of similar and/or complementary products based on the relationships stored in the knowledge graph.

In this regard, generative AI product search query manager 108 can provide textual prompts and/or images generated from the textual prompts for the specific customer to application 110 of the user device. The textual prompts and/or images generated from the textual prompts can be displayed via a display screen of the user device and may be presented in any manner. Further, generative AI product search query manager 108 can provide data regarding search queries, products, customers, etc. to application 110 of the user device for use by the business (e.g., the e-commerce website). The data can be displayed via a display screen of the user device and may be presented in any manner.

For cloud-based implementations, the instructions on generative AI product search query manager 108 can implement one or more components, and application 110 can be utilized by a user to interface with the functionality implemented on generative AI product search query manager 108. In some cases, application 110 comprises a web browser. In other cases, generative AI product search query manager 108 may not be required. For example, the components of generative AI product search query manager 108 may be implemented completely on a user device, such as user device 102. In this case, generative AI product search query manager 108 may be embodied at least partially by the instructions corresponding to application 110.

Thus, it should be appreciated that generative AI product search query manager 108 may be provided via multiple devices arranged in a distributed environment that collectively provide the functionality described herein. Additionally, other components not shown may also be included within the distributed environment. In addition, or instead, generative AI product search query manager 108 can be integrated, at least partially, into a user device, such as user device 102. Furthermore, generative AI product search query manager 108 may at least partially be embodied as a cloud computing service.

Figure 2:
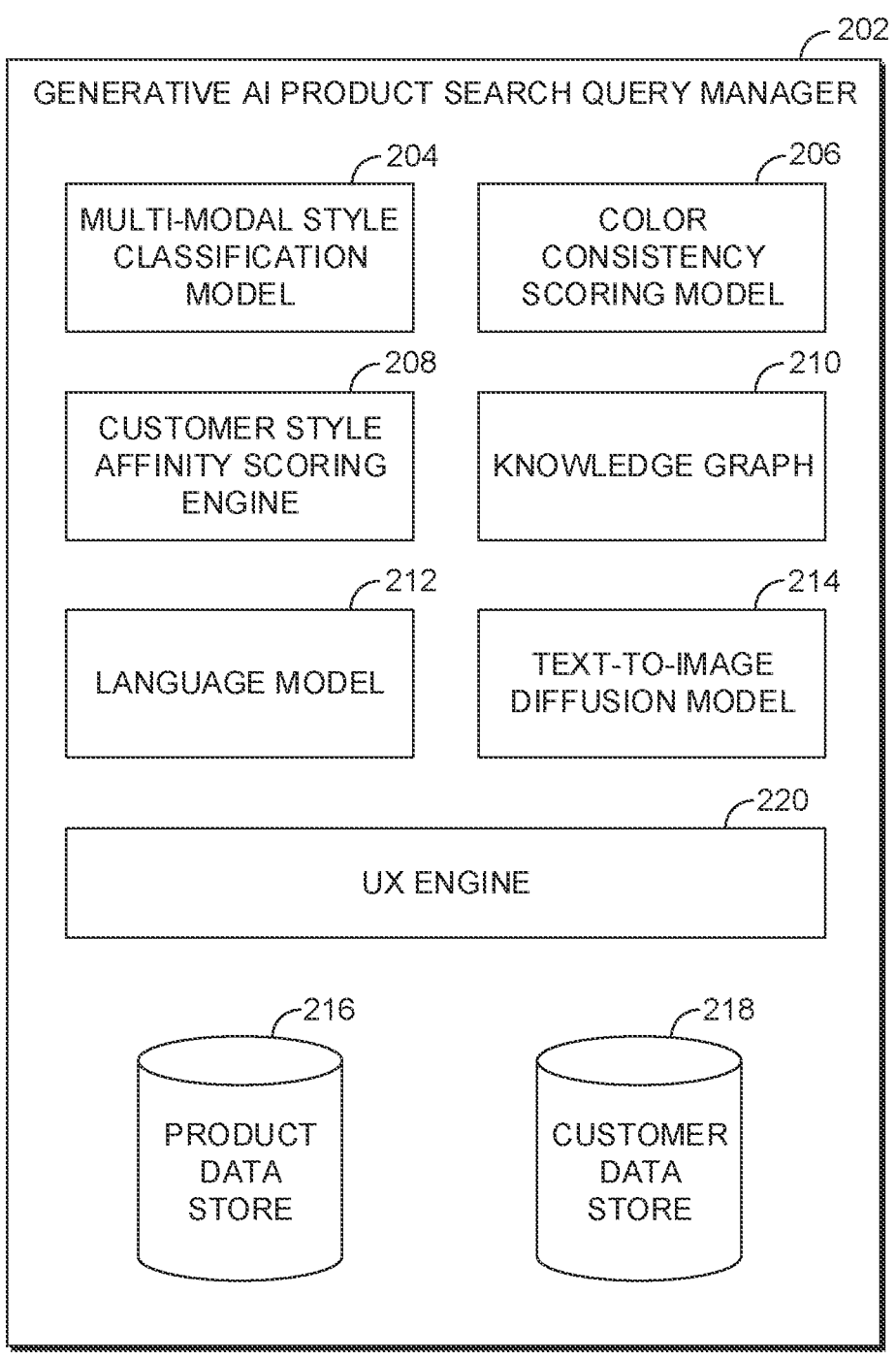
FIG. 2 depicts an example configuration of an operating environment in which some implementations of the present disclosure can be employed, in accordance with various embodiments of the present disclosure.

Referring to FIG. 2, aspects of an illustrative generative AI product search query management system are shown, in accordance with various embodiments of the present disclosure. At a high level, embodiments described herein using generative AI to optimize product search queries by determining relationships between products for storage in a knowledge graph and using a generative language model trained on the relationships stored in the knowledge graph to generate textual prompts for a text-to-image diffusion model As shown in FIG. 2, generative AI product search query manager 202 includes a multi-modal style classification model 204, a color consistency scoring model 206, a customer style affinity scoring engine 208, a knowledge graph 210, a language model 212, a text-to-image diffusion model 214, a product data store 216, a customer data store 218, and a user experience (UX) engine 220. The foregoing components of generative AI product search query manager 202 can be implemented, for example, in operating environment 100 of FIG. 1. In particular, those components may be integrated into any suitable combination of user devices 102 and/or generative AI product search query manager 108.

Product data store 216 and customer data store 218 can store computer instructions (e.g., software program instructions, routines, or services), data, and/or models used in embodiments described herein. In some implementations, product data store 216 and customer data store 218 stores information or data received or generated via the various components of generative AI product search query manager 202 and provides the various components with access to that information or data, as needed. Although depicted as two components, product data store 216 and customer data store 218 may be embodied as one or more data stores or each as one or more data stores. Further, the information in product data store 216 and customer data store 218 may be distributed in any suitable manner across one or more data stores for storage (which may be hosted externally).

In embodiments, data stored in product data store 216 includes product images, product names, prices, descriptions, product image/description training data, and/or the like. For example, product data store 216 can store product descriptions and/or product images for a set or catalog of products. Product data store 216 can also store a training set or catalog of product descriptions and product images to train multi-modal style classification model 204. For example, product data store 216 can store a set of product descriptions and images with corresponding labels (e.g., style labels) to be used as training data for the multi-modal style classification model 204. In some cases, generative AI product search query manager 202, or components associated therewith, can obtain product data from client devices (e.g., a user device(s)). In other cases, product data can be received from one or more data stores in the cloud, or data generated by the generative AI product search query manager 202.

In embodiments, data stored in customer data store 218 includes customer data. For example, customer data store 218 can store customer data from various sources, such as social platforms, e-commerce platforms, location data for a customer's device, or any data source that provides data about the customer. In one example, with respect to the example of FIG. 5, customer data includes the customer's recent design prompts (e.g., search history), recent purchases, and saved moodboards (e.g., through an API connecting an external moodboard such as Pinterest®, an internal moodboard saved on the website where the customer is performing its search queries, or etc. In some cases, generative AI product search query manager 202, or components associated therewith, can obtain customer data from client devices (e.g., a user device(s)). In other cases, customer data can be received from one or more data stores in the cloud, or data generated by the generative AI product search query manager 202.

The multi-modal style classification model 204 is generally configured to classify input products into a corresponding style based on product descriptions and product images and/or classify a customers into corresponding styles based on customer data. The multi-modal style classification model 204 can include rules, conditions, associations, models, algorithms, or the like to classify input products and/or customers into corresponding styles. For example, multi-modal style classification model 204 may comprise natural language processing techniques, statistical model, fuzzy logic, neural network, finite state machine, support vector machine, logistic regression, clustering, or machine-learning techniques, similar statistical classification processes, or combinations of these to classify input products and/or customers into corresponding styles.

In embodiments, a catalog of products is obtained and stored in product data store 216. The catalog of products can be products offered on a website for customers to purchase. In embodiments, each product in the catalog of products includes a corresponding product description and product image. The product description can include various textual descriptions, such as the title, type of product, how the product is manufactured, or any other text describing the product. In some embodiments, each product in the catalog of products are classified into a corresponding style by multi-modal style classification model 204. For example, with respect to the example of FIG. 3, the styles are "contemporary," "transitional, "modern," "traditional," "eclectic," "minimalist," "mid-century," and "bohemian." In embodiments, multi-modal style classification model 204 is trained to output a style of unseen, input products. For example, the multi-modal style classification model 204 can be trained based on a training set of products. In one example, with respect to the example of FIG. 3, the multi-modal style classification model is trained based on a training set of home décor products with the corresponding title, description, and images of the training set of home décor products along with their "style" tags (e.g., labels) labelled by interior designers and/or any person or algorithm that is capable of labelling the products with style tags. After the multi-modal style classification model 204 is trained (e.g., in the example of FIG. 3), the unseen product (e.g., the product description 302A, product title 302B, and product image 302C of the unseen product) can be input into the multi-modal style classification model 204 to output the corresponding style of the previously unseen product.

The color consistency scoring model 206 is generally configured to generate a color consistency score between products based on the color palettes of each product. The color consistency scoring model 206 can include rules, conditions, associations, models, algorithms, or the like to generate a color consistency score between products based on the color palettes of each product. For example, color consistency scoring model 206 may comprise a statistical model, fuzzy logic, neural network, finite state machine, support vector machine, logistic regression, clustering, or machine-learning techniques, similar statistical classification processes, or combinations of these to generate a color consistency score between products based on the color palettes of each product.

In embodiments, the color palette of each product is extracted by color consistency scoring model 206 from the product image(s) of each product. The color palette extracted for each product can be any number of colors of the product and in any form, such as vectors corresponding to the colors of the color palette extracted from the product image(s) of the product. For example, with respect to the example of FIG. 6, each product includes the three main colors (e.g., most prominent colors in the clustering algorithm) of each product represented by the respective hexadecimal color code of the color.

In embodiments, the color palette vectors extracted from each product are input into a color consistency scoring model 206 to generate a color consistency score between the two products. In embodiments, if the color consistency score between the two or more products is higher (e.g., the Euclidian distance between the color palette vectors of the two products are lower), the textual prompt generated by the language model and/or images generated by the text-to-image diffusion model with the two or more products can be ranked higher in the textual prompts generated by the language model and/or images generated by the text-to-image diffusion model in response to the search query (e.g., the textual prompt). Further, in some embodiments, if the color consistency score between the two or more products is lower (e.g., the Euclidian distance between the color palette vectors of the two products are higher), the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt).

The customer style affinity scoring engine 208 is generally configured to generate a customer style affinity score for a customer based on customer data for the customer. The customer style affinity scoring engine 208 can include rules, conditions, associations, models, algorithms, or the like to generate the customer style affinity score. For example, customer style affinity scoring engine 208 may comprise natural language processing techniques, statistical model, fuzzy logic, neural network, finite state machine, support vector machine, logistic regression, clustering, or machine-learning techniques, similar statistical classification processes, or combinations of these to generate the customer style affinity score.

In some embodiments, the textual prompts generated by the language model and/or images generated by the text-to-image diffusion model with sets of products are ranked according to customer style affinity scores for a customer. The customer style affinity scoring model 208 is trained to generate style scores for a customer based on input customer data as stored in customer data store 218. For example, with respect to the example of FIG. 5, the multi-modal style classification model (e.g., 204) can be utilized to classify the customer based on the customer data and the style affinity scoring model (e.g., 218) can generate scores for the customer based on the classification output by the multi-modal style classification model (e.g. 204). The customer data used to generate the customer style affinity score for a customer can be based on customer data for the customer as stored in customer data store 218. For example, with respect to the example of FIG. 5, customer data includes the customer's recent design prompts (e.g., search history), recent purchases, and saved moodboards (e.g., through an API connecting an external moodboard such as Pinterest®, an internal moodboard saved on the website where the customer is performing its search queries, or etc.).

In embodiments, if a style score for the textual prompt generated by the language model and/or images generated by the text-to-image diffusion model is closer to the customer style affinity score for customer as generated by customer style affinity scoring model 208, the textual prompt generated by the language model and/or images generated by the text-to-image diffusion model can be ranked higher in the textual prompts generated by the language model and/or images generated by the text-to-image diffusion model in response to the search query (e.g., the textual prompt). Further, in some embodiments, if a style score for the textual prompt generated by the language model and/or images generated by the text-to-image diffusion model is further away from the customer style affinity score for customer as generated by customer style affinity scoring model 208, the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt).

In some embodiments, the customer style affinity score is updated by customer style affinity scoring engine 208 each time a customer enters the website to perform the search query or at automated intervals in order to capture the evolving style affinities of the customer.

The knowledge graph 210 is generally configured to store relationships between products. The knowledge graph 210 can include rules, conditions, associations, models, algorithms, or the like to store relationships between products. In embodiments, relationships of products are stored in a knowledge graph 210. As a specific example of relationships that can be stored in a knowledge graph, with respect to the example of FIG. 6, the knowledge graph captures relationships, such as (a) room type (e.g., a subset of complimentary products) and style associations, (b) room type (e.g., a subset of complimentary products) and furniture (e.g., a type of product) associations, (c) furniture (e.g., a type of product) and color associations, and (d) color consistency scores between two products (e.g., as shown by example stock keeping units (SKUs) of each product) in the catalog of products.

In one example, relationships regarding the colors and/or color palettes of products can be stored in the knowledge graph 210 (e.g., the colors of products as extracted by color consistency scoring model 206). For example, with respect to the example of FIG. 6, the relationship of each product (e.g., each SKU) to its corresponding color palette is stored in the knowledge graph. In another example, relationships regarding the style of products can be stored in the knowledge graph 210 (e.g., the styles of products as classified by multi-modal style classification model 204). For example, with respect to the example of FIG. 6, the relationship of each product (e.g., each SKU) to its corresponding style (e.g., contemporary) is stored in the knowledge graph. Also with respect to the example of FIG. 6, the relationship between the style (e.g., "contemporary") and the subset of complimentary products (e.g., "living room") can be stored in the knowledge graph. In another example, relationships regarding product type of products can be stored in the knowledge graph 210 (e.g., the product type of each product from product descriptions as stored in product data store 216). For example, as described with respect to the example of FIG. 6, the relationship of the product (e.g., each SKU) to its corresponding type of product (e.g., sectional couch, rug, or coffee table). In another example, relationships regarding product attributes of products can be stored in the knowledge graph 210 (e.g., the product attributes of each product from product descriptions as stored in product data store 216). For example, with respect to the example of FIG. 8J, the product attributes of the product type (e.g., bathtub) are "type of bath," "tub size," "installation type," "drain placement," and "brand" and can be stored in the knowledge graph with respect to other products of the same product type. In another example, relationships regarding subsets of complementary products can be stored in the knowledge graph 210 (e.g., subsets of complimentary products with respect to a product can be included in product descriptions as stored in product data store 216). For example, with respect to the example of FIG. 6, the relationship between products types (e.g., "coffee table," a "rug," and a "sectional couch") and the subset of complimentary products (e.g., "living room") is stored in the knowledge graph. As can be understood, any relationships regarding the products of the product catalog can be stored in the knowledge graph 210.

The language model 212 is generally configured to interpret input text and/or generate textual prompts based on relationships of products as stored in the knowledge graph 210. The language model 212 can include rules, conditions, associations, models, algorithms, or the like to interpret input text and/or generate textual prompts based on relationships of products as stored in the knowledge graph 210. For example, language model 212 may comprise natural language processing techniques, statistical model, fuzzy logic, neural network, finite state machine, support vector machine, logistic regression, clustering, or machine-learning techniques, similar statistical classification processes, or combinations of these to interpret input text and/or generate textual prompts based on relationships of products as stored in the knowledge graph 210.

In embodiments, language model 212 generates a textual prompt with sets of products based on the knowledge graph 210. In embodiments, the language model 212 can be trained based on the relationships stored in the knowledge graph 210 to generate textual prompts in human-readable text for display to an end user (e.g., a customer). For example, with respect to the example of FIG. 7 and example knowledge graph of FIG. 6, a pre-trained language generation model, leverages the relationships stored in the knowledge graph, such as room type, room style, furniture type and furniture color, to generate logical and human readable textual prompts as output for each combination of room type, room style, furniture type, and/or furniture color (e.g., the example of FIG. 8B, language model generates the textual prompt of "modern minimalistic bathroom with bathtub, windows, plants, and wooden floor"). In this regard, the textual prompt generated by the language model 212 can be utilized to guide the output of the text-to-image diffusion model 214 as the language model 212 is trained based on the relationships between products as stored in the knowledge graph 210.

Further, in some embodiments, any input (e.g., text or images, customer data, etc.) can be utilized by language model 212 to guide the output textual prompt of the language model 212. For example, with respect to the example of FIGS. 8B and 8C, the customer may begin by inputting text and/or image(s) (e.g., the customer inputs "modern minimalistic bathroom with bathtub") into the search query and the language model generates textual prompts (e.g., "modern minimalistic bathroom with bathtub and wooden floor," "modern minimalistic bathroom with bathtub, windows, plants, and wooden floor," etc.) based on the input from the customer. In some embodiments, an image-to-text diffusion model can generate text from input images in order to input images as search queries into language model 212 to guide the language model 212 in generating textual prompts. In other embodiments, the language model 212 can begin by generating a textual prompt, the customer can refine the textual prompt through input text or images, and the language model 212 can refine the textual prompt based on the customer's input.

In some embodiments, with respect to the example shown in FIG. 8F, the language model can generate the textual prompt based on a selected style, recent purchases, moodboards, recent searches, the customer's locations, the customer style affinity score, etc. In this regard, customer data can be used to generate personalized textual prompts by the language model 212. In some embodiments, customer data can be used to determine products affinity scores, complementary product affinity scores, color affinity scores, and other scores to generate personalized textual prompts by the language model 212.

The text-to-image diffusion model 214 is generally configured to generate an image with the product images from the catalog based on the textual prompt generated by language model 212. The text-to-image diffusion model 214 can include rules, conditions, associations, models, algorithms, or the like to generate an image with the product images from the catalog based on the textual prompt generated by language model 212. For example, text-to-image diffusion model 214 may comprise natural language processing techniques, statistical model, fuzzy logic, neural network, finite state machine, support vector machine, logistic regression, clustering, or machine-learning techniques, similar statistical classification processes, or combinations of these to generate an image with the product images from the catalog based on the textual prompt generated by language model 212.

In embodiments, an image (or images) of a set of products (or sets of products) are generated through a text-to-image diffusion model 214 based on the textual prompt generated by the language model 212. For example, with respect to the example of FIG. 7, the text-to-image diffusion model generates three (3) images of different sets of products, where each set of products includes a number of products from the catalog of products, based on the textual prompt generated by a language model. Although three (3) images of different sets of products are shown, any amount of images with any amount of sets of products, where each set of products includes any amount of products are within the scope of the present disclosure. As another example, with respect to the example of FIG. 8D, six (6) images of different sets of products are generated by the text-to-image diffusion model based on the textual prompt generated by a language model.

The UX engine 220 is generally configured to enable a customer to indicate a product in order to generate a list of similar products, a list of complementary products, and/or modifiable product attributes of the product to generate a list of similar products with the modified product attribute(s). The UX engine 220 can include rules, conditions, associations, models, algorithms, or the like to enable a customer to indicate a product in order to generate a list of similar products, a list of complementary products, and/or modifiable product attributes of the product to generate a list of similar products with the modified product attribute(s).

In embodiments, UX engine 220 can present a GUI to the customer to interact with the textual prompts generated by the language model 212 during the search query. For example, with respect to the example shown in FIG. 8A-8D, exemplary schematic screen display 800A allows a customer to select a search option (e.g., 802A). Exemplary schematic screen display 800B presents a search query bar (e.g., 802B) in the GUI where a customer can enter text of the search query. As the customer enters text (e.g., "modern minimalistic bathroom with bathtub") in the search query bar of exemplary schematic screen display 800C, the language model 212 generates a number of textual prompts and a customer can select one of the textual prompts (e.g., 802C). In exemplary schematic screen display 800D, a number of images with different sets of products are generated by the text-to-image diffusion model 214 and the customer can select one of the images (e.g., 802D). In another example of UX engine 220, with respect to the example shown in FIG. 8E-8F, exemplary schematic screen display 800E allows a customer to select an element (e.g., inspiration 802E). Exemplary schematic screen display 800F displays a number of images generated by the text-to-image diffusion model 214 based on textual prompts generated by the language model 212 with respect to a selected style (e.g., 802F), recent purchases (e.g., 804F), moodboards (e.g., 806F), recent searches (e.g., 808F), and/or the customer's locations (e.g., 810F). The customer can select an image (e.g., 812F).

In embodiments of UX engine 220, following selection of the image (e.g., 802D or 812F), in exemplary schematic screen display 800G of FIG. 8G, the image is displayed to the end user (e.g., a customer) through the GUI. The products of the set of products of the image are displayed through the GUI (e.g., 802G). As shown in the example, the set of products includes the ceiling pendant, planter, and bathtub. The customer can select the one of the products of the set of products for display in the GUI (e.g., the bathtub). In embodiments of UX engine 220, the customer can then indicate (e.g., select or hover over) the bathtub (e.g., 804G) for additional actions.

In embodiments of UX engine 220, as shown in exemplary schematic screen display 800H, 800I, and 800J of FIGS. 8G-8I, the GUI can include a number of elements indicating types of requests, such as a request for complementary products, a request for similar products, and/or a request to customize product attributes of the product. In embodiments of UX engine 220, upon selection of similar products (802H) in exemplary schematic screen display 800H and the indication of a product in the image (e.g., 804G in FIG. 8G), a list of similar products related to the product type of the product (e.g., 804H) can be generated based on relationships stored in the knowledge graph 210. For example, 804H shows a number of similar bathtubs (e.g., product type) of a similar color and style in response to the selection of similar products and indication of the bathtub of the set of product of the image. In embodiments of UX engine 220, the customer can then select items from the list for review, purchase, and/or perform further requests.

In embodiments of UX engine 220, upon selection of complementary products (806H and 802I) in exemplary schematic screen display 800I and the indication of a product in the image (e.g., 804G in FIG. 8G), a list of complementary products (e.g., 804I) can be generated based on relationships stored in the knowledge graph 210. For example, 804I shows a number of complementary products (e.g., clover wood and glass bath accessories, faux hide bath mat, etc.) of a similar style and/or color in response to the selection of complementary products and indication of the bathtub of the set of product of the image. In embodiments of UX engine 220, the customer can then select items from the list for review, purchase, and/or perform further requests.

In embodiments of UX engine 220, upon selection of "customize" (806I and 802J) in exemplary schematic screen display 800J and the indication of a product in the image (e.g., 804G in FIG. 8G), a list of product attributes for the product (e.g., 804J) can be generated based on relationships stored in the knowledge graph 210. For example, with respect to the example of FIG. 8J, the product attributes 804J of the product type (e.g., bathtub) are "type of bath," "tub size," "installation type," "drain placement," and "brand" and can be stored in the knowledge graph with respect to other products of the same product type. In embodiments of UX engine 220, the customer can customize the product attributes (e.g., 804J). Based on the changes to the product attributes (e.g., 804J), a list of products with the corresponding different product attributes can be generated based on relationships stored in the knowledge graph 210. In embodiments of UX engine 220, the customer can then select items from the list for review, purchase, and/or perform further requests.

Figure 3:
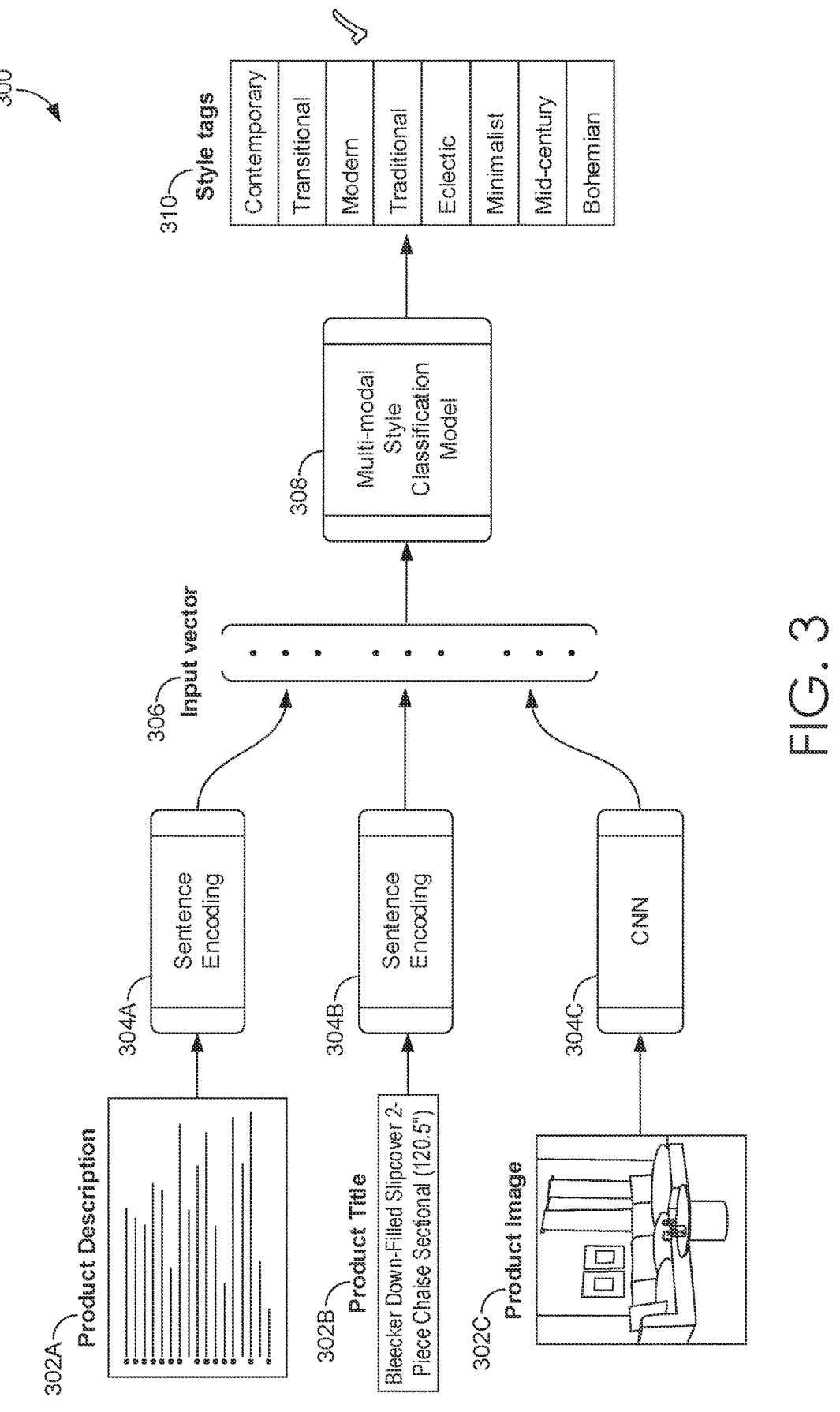
FIG. 3 provides an example diagram of an example multi-modal style classification model implemented to use generative AI to optimize product search query results, in accordance with embodiments of the present disclosure.

FIG. 3 provides an example diagram of an example multi-modal style classification model, in accordance with embodiments described herein. As described herein, such a multi-modal style classification model can be used to optimize product search query results through generative AI. Diagram 300 is an example diagram for an example multi-modal style classification model to output a style for an input product.

As shown, a catalog of products is obtained. The catalog of products can be products offered on a website for customers to purchase. In embodiments, each product in the catalog of products includes a corresponding product description 302A, product title 302B, and product image 302C. The product description 302A can include various textual descriptions, such as the title 302B, type of product, how the product is manufacturing, or any other text describing the product. A sentence encoding 304A can be generated based on the product description 302A through a word embedding, recurrent neural network (RNN), convolutional neural network (CNN), transformer model and/or any similar processes. A sentence encoding 304B can be generated based on the product title 302B through a word embedding, recurrent neural network (RNN), convolutional neural network (CNN), transformer model and/or any similar processes. An image feature vector 304C can be generated based on the product image 302C through a convolutional neural network (CNN), and/or any similar processes. Sentence encoding 304A, sentence encoding 304B, and image feature vector 304C can be input as an input vector 306 into a multi-modal style classification model 308. The multi-modal style classification model 308 can output a style (e.g., style tags 310) of the input product based on the corresponding input product description 302A, input product title 302B, and input product image 302C.

In this regard, each product in the catalog of products are classified into a corresponding style by the multi-modal style classification model 308. For example, the style tags 310 are "contemporary," "transitional," "modern," "traditional," "eclectic," "minimalist," "mid-century," and "bohemian." In embodiments, the multi-modal style classification model 308 is trained to output a style of unseen, input products. For example, the multi-modal style classification model 308 can be trained based on a training set of products. In one example, the multi-modal style classification model 308 is trained based on a training set of home décor products with the corresponding title, description, and images of the training set of home décor products along with their style tags (e.g., labels) labelled by interior designers and/or any person or algorithm that is capable of labelling the products with style tags. After the multi-modal style classification model 308 is trained, the unseen product (e.g., the product description 302A, product title 302B, and product image 302C of the unseen product) can be input into the multi-modal style classification model 308 to output the corresponding style (e.g., style based on style tags 310) of the previously unseen product.

Figure 4:
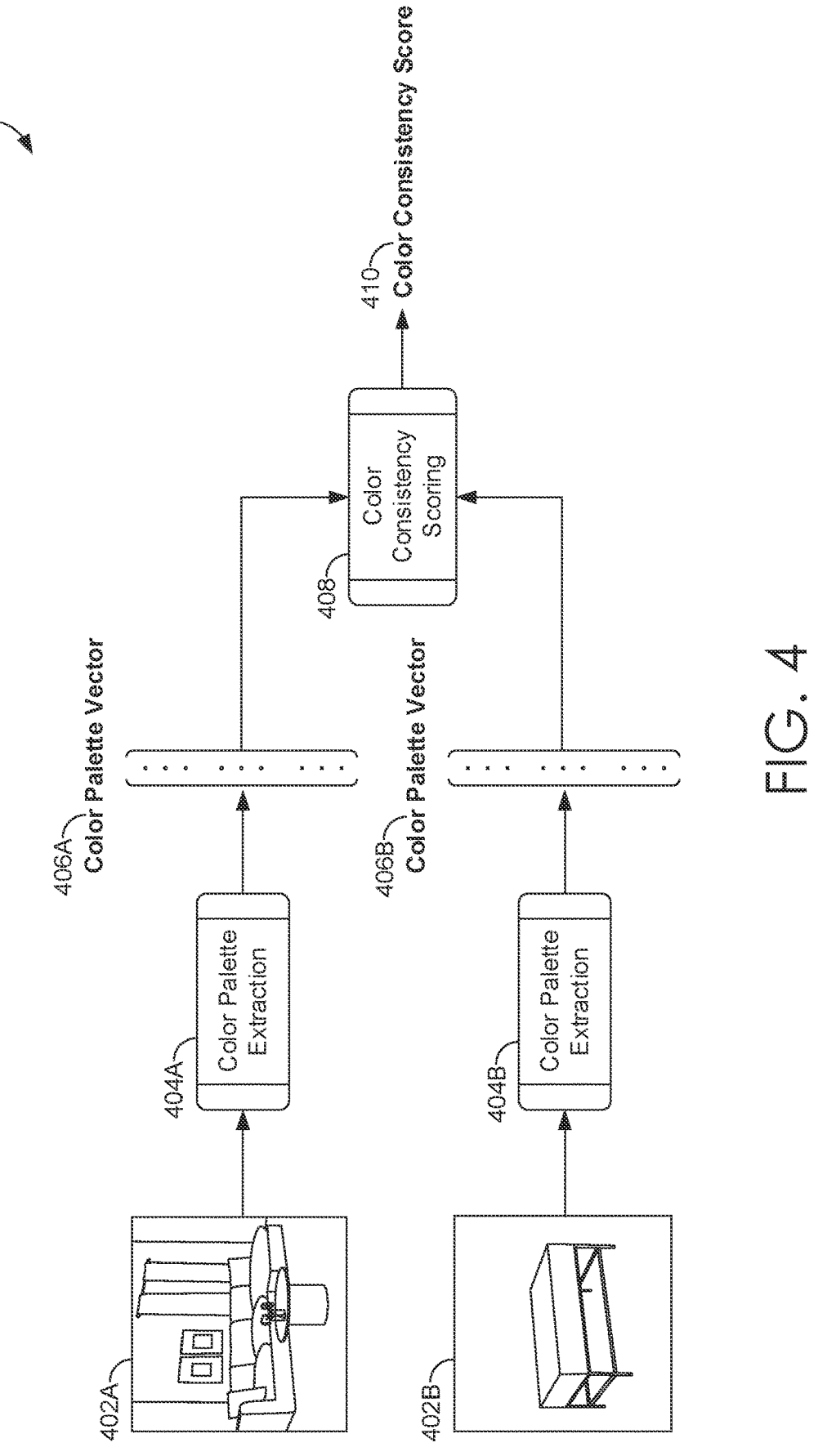
FIG. 4 provides an example diagram of an example color consistency scoring model implemented to use generative AI to optimize product search query results, in accordance with embodiments of the present disclosure.

FIG. 4 provides an example diagram of an example color consistency scoring model, in accordance with embodiments described herein. As described herein, such a color consistency scoring model can be used to optimize product search query results through generative AI. Diagram 400 is an example diagram for an example color consistency scoring model to output a color consistency score between products. As shown, the color palettes 404A and 404B of two or more products are extracted from the product image(s) 402A and 402B of each product. The color palette 404A and 404B extracted for each product can be any number of colors of the product and in any form, such as vectors corresponding to the colors of the color palette extracted from the product image(s) 402A and 402B of the product. For example, with respect to the example of FIG. 6, each product includes the three main colors (e.g., most prominent colors) of each product represented by the respective hexadecimal color code of the color. Referring back to FIG. 4, the color palette vectors 406A and 406B extracted from each product are input into a color consistency scoring model 408 to generate a color consistency score 410 between the two products. In embodiments, if the color consistency score 410 between the two or more products is higher (e.g., the Euclidian distance between the color palette vectors of the two products are lower), the textual prompt generated by the language model and/or images generated by the text-to-image diffusion model with the two or more products can be ranked higher in the textual prompts generated by the language model and/or images generated by the text-to-image diffusion model in response to the search query (e.g., the textual prompt). Further, in some embodiments, if the color consistency score 410 between the two or more products is lower (e.g., the Euclidian distance between the color palette vectors of the two products are higher), the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt).

Figure 5:
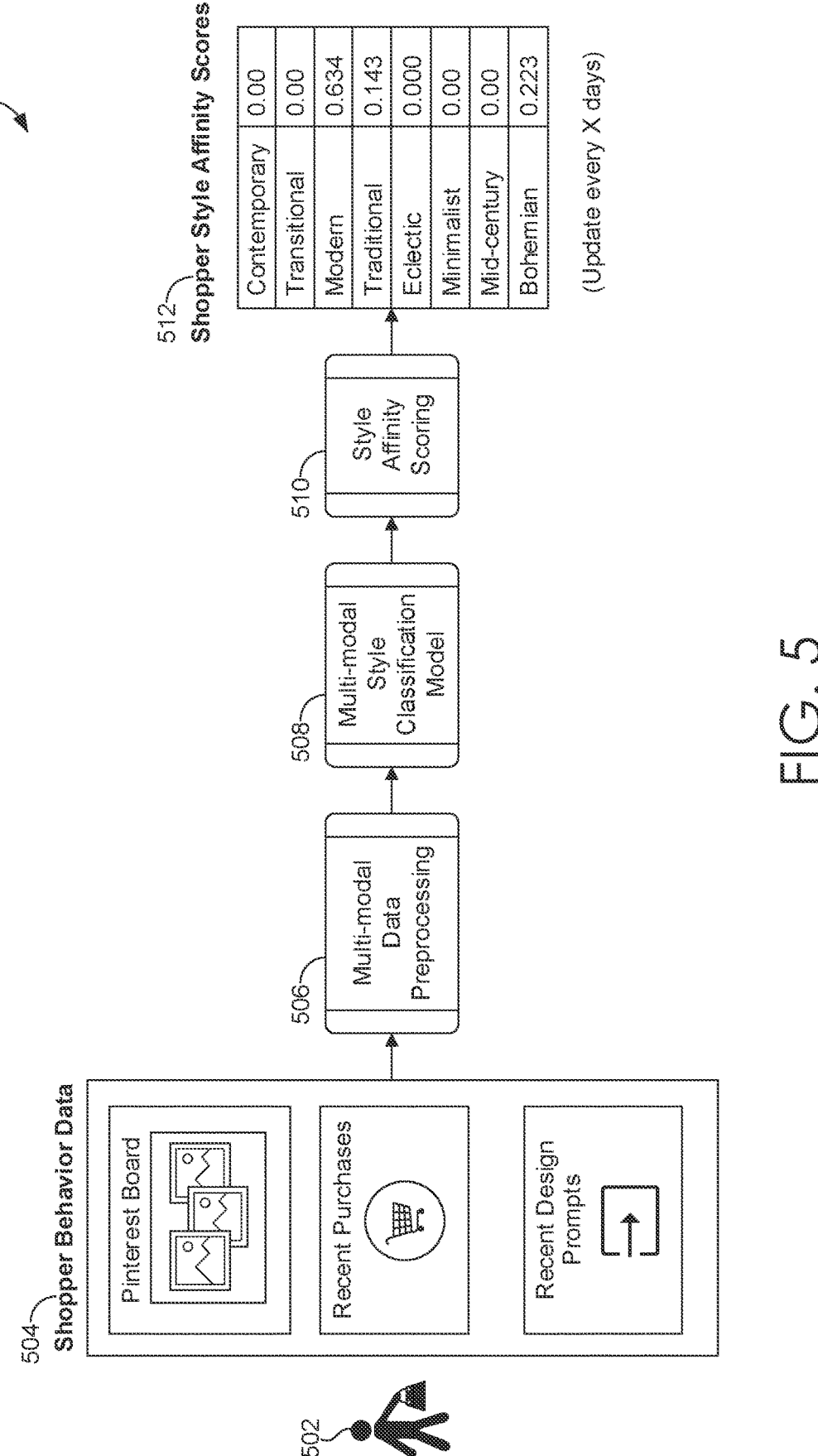
FIG. 5 provides an example diagram of an example customer style affinity scoring engine implemented to use generative AI to optimize product search query results, in accordance with embodiments of the present disclosure.

FIG. 5 provides an example diagram of an example customer style affinity scoring engine, in accordance with embodiments described herein. As described herein, such a customer style affinity scoring engine can be used to optimize product search query results through generative AI. Diagram 500 is an example diagram for an example customer style affinity scoring engine to output a customer style affinity score. Customer data 504 is stored and/or retrieved for a customer 502. For example, customer data 504 includes the customer's recent design prompts (e.g., search history), recent purchases, and saved moodboards (e.g., through an API connecting an external moodboard such as Pinterest®, an internal moodboard saved on the website where the customer is performing its search queries, or etc.). The customer data 504 enters a multi-modal data preprocessing model 506 in order to generate a vector(s) based on the various text and images of customer data 504. The vector(s) from multi-modal data preprocessing model 506 is input into multi-modal style classification model 508. The classification output from the multi-modal style classification model is then input into customer style affinity scoring model 510 to output a customer style affinity score 512. As can be understood, the customer style affinity score 512 can be a score based on the probability of each of the styles based on the customer data. In some embodiments, the customer style affinity score 512 is updated each time a customer 502 enters the website to perform the search query or at automated intervals in order to capture the evolving style affinities of the customer 502.

Figure 6:
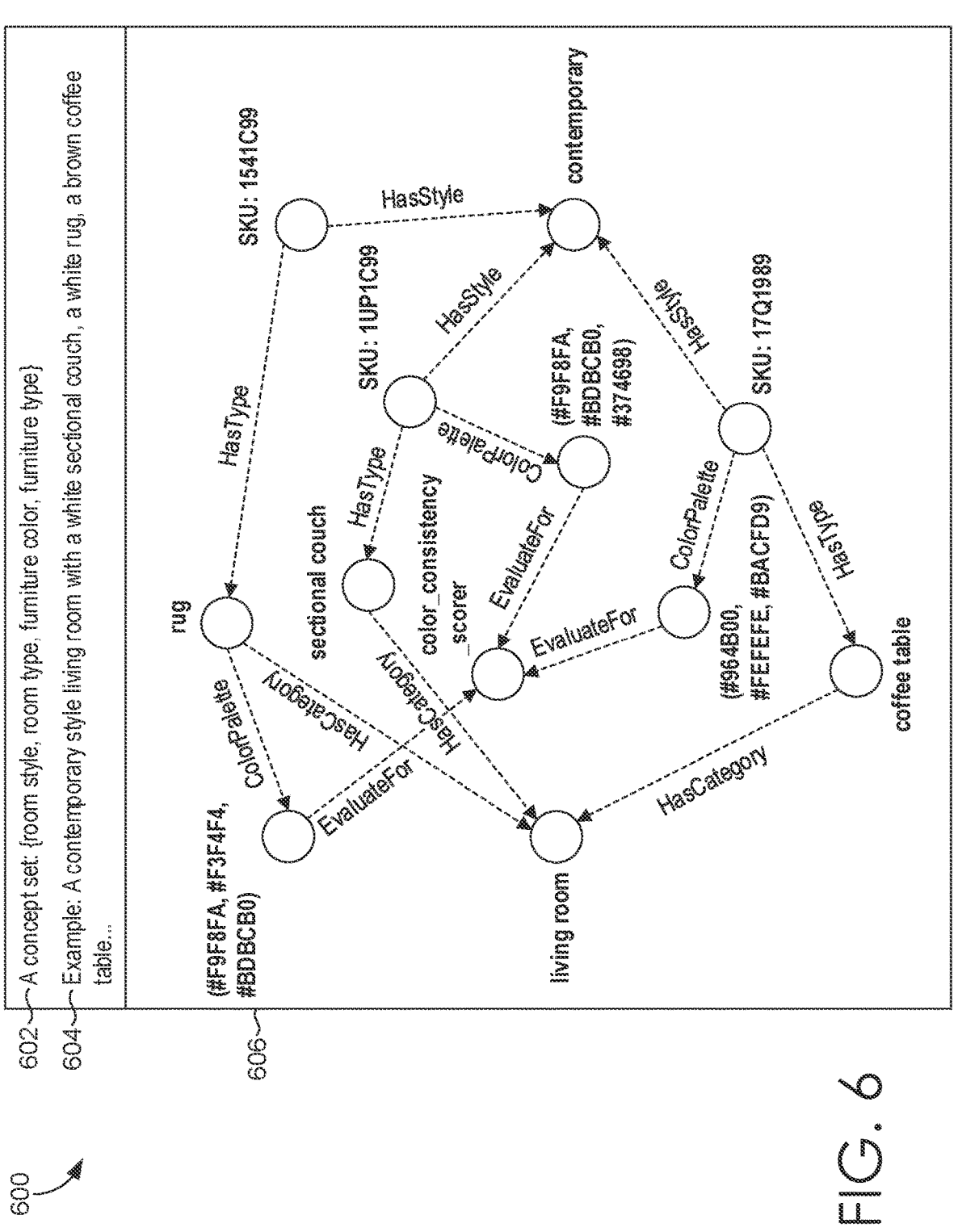
FIG. 6 provides an example diagram of an example knowledge graph implemented to use generative AI to optimize product search query results, in accordance with embodiments of the present disclosure.

FIG. 6 provides an example diagram of an example knowledge graph, in accordance with embodiments described herein. As described herein, such a knowledge graph can be used to optimize product search query results through generative AI. Diagram 600 is an example diagram for an example knowledge graph to store relationships between products of a catalog. As shown, relationships of products are stored in a knowledge graph 606 with respect to a set of concepts (e.g., entities) 602. In the specific example of FIG. 6, the knowledge graph captures relationships of concepts 602, such as (a) room type (e.g., a subset of complimentary products) and style associations, (b) room type (e.g., a subset of complimentary products) and furniture (e.g., a type of product) associations, (c) furniture (e.g., a type of product) and color associations, and (d) color consistency scores between two products (e.g., as shown by example stock keeping units (SKUs) of each product) in the catalog of products. The knowledge graph 606 shows the relationships of the concept set 602 in the example textual prompt 604 generated by a language model: "A contemporary style living room with a white sectional couch, a white rug, a brown coffee table."

In the example knowledge graph 606, relationships regarding the colors and/or color palettes of products can be stored in the knowledge graph 606. For example, the relationship of each product (e.g., each SKU) to its corresponding color palette is stored in the knowledge graph 606. In the example knowledge graph 606, relationships regarding the style of products can be stored in the knowledge graph 606. For example, the relationship of each product (e.g., each SKU) to its corresponding style (e.g., contemporary) is stored in the knowledge graph 606. Further, the relationship between the style (e.g., "contemporary") and the subset of complimentary products (e.g., "living room") can be stored in the knowledge graph 606. In the example knowledge graph 606, relationships regarding product type of products can be stored in the knowledge graph 606. For example, the relationship of the product (e.g., each SKU) to its corresponding type of product (e.g., sectional couch, rug, or coffee table) is stored in the knowledge graph 606. In the example knowledge graph 606, relationships regarding product attributes of products can be stored in the knowledge graph 606. For example, with respect to the example of FIG. 8J, the product attributes of the product type (e.g., bathtub) are "type of bath," "tub size," "installation type," "drain placement," and "brand" and can be stored in the knowledge graph 606 with respect to other products of the same product type. In the example knowledge graph 606, relationships regarding subsets of complementary products can be stored in the knowledge graph 606. For example, the relationship between products types (e.g., "coffee table," a "rug," and a "sectional couch") and the subset of complimentary products (e.g., "living room") is stored in the knowledge graph 606. As can be understood, any relationships regarding the products of the product catalog can be stored in the knowledge graph 606.

Figure 7:
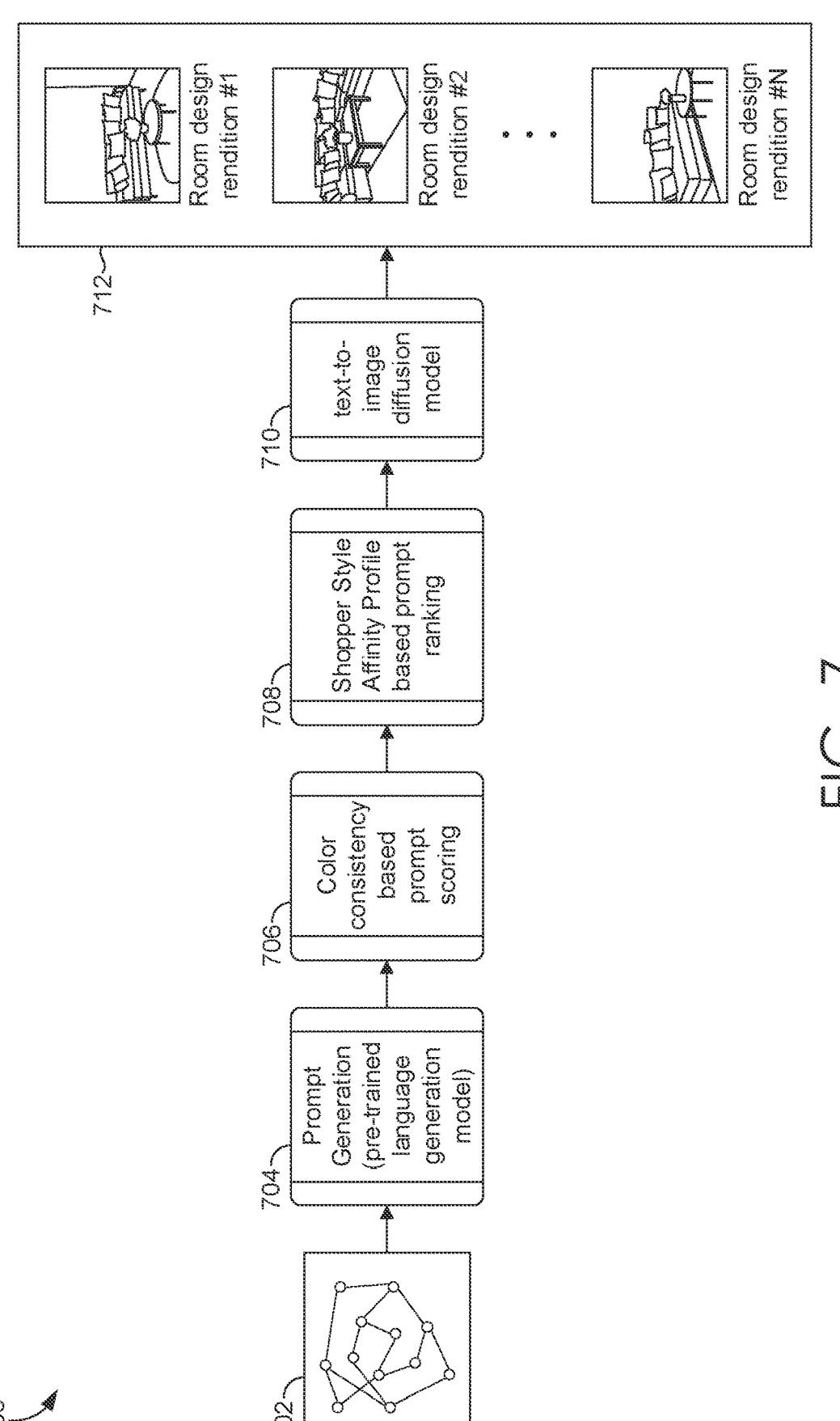
FIG. 7 provides an example diagram for implementing generative AI to optimize product search query results, in accordance with embodiments of the present disclosure.

FIG. 7 provides an example diagram for implementing generative AI to optimize product search query results, in accordance with embodiments described herein. Diagram 700 is an example diagram for implementing generative AI to optimize product search query results to output images of sets of products for a customer search query. As shown, a language model 704 generates textual prompts, each textual prompt with a set of products, based on the relationships of the products stored in knowledge graph 702. In embodiments, the language model 704 can be trained based on the relationships stored in the knowledge graph 702 to generate textual prompts in human-readable text for display to an end user (e.g., a customer). For example, a pre-trained language generation model 704, leverages the relationships stored in the knowledge graph 702, such as room type, room style, furniture type and furniture color, to generate logical and human readable textual prompts as output for each combination of room type, room style, furniture type, and/or furniture color (e.g., the example of FIG. 8B, language model generates the textual prompt of "modern minimalistic bathroom with bathtub, windows, plants, and wooden floor"). In this regard, the textual prompts generated by the language model 704 can be utilized to guide the output of the text-to-image diffusion model 710 as the language model 704 is trained based on the relationships between products as stored in the knowledge graph 702.

Further, in some embodiments, any input (e.g., text or images, customer data, etc.) can be utilized to guide the output textual prompt of the language model 704. For example, with respect to the example of FIGS. 8B and 8C, the customer may begin by inputting text and/or image(s) (e.g., the customer inputs "modern minimalistic bathroom with bathtub") into the search query and the language model generates textual prompts (e.g., "modern minimalistic bathroom with bathtub and wooden floor," "modern minimalistic bathroom with bathtub, windows, plants, and wooden floor," etc.) based on the input from the customer. In some embodiments, an image-to-text diffusion model (not shown) can generate text from input images in order to input images as search queries to guide the language model 704 in generating textual prompts. In other embodiments, the language model 704 can begin by generating a textual prompt, the customer can refine the textual prompt through input text or images, and the language model 704 can refine the textual prompt based on the customer's input.

In some embodiments, with respect to the example shown in FIG. 8F, the language model can generate the textual prompt based on a selected style, recent purchases, moodboards, recent searches, the customer's locations, the customer style affinity score, etc. In this regard, customer data can be used to generate personalized textual prompts by the language model. In some embodiments, customer data can be used to determine products affinity scores, complementary product affinity scores, color affinity scores, and other scores to generate personalized textual prompts by the language model.

In this regard, an image (or images) of a set of products (or sets of products) are generated through a text-to-image diffusion model 710 based on the textual prompt generated by the language model. For example, the text-to-image diffusion model 710 generates output 712 of three (3) images of different sets of products, where each set of products includes a number of products from the catalog of products, based on the textual prompt generated by a language model 704. Although three (3) images of different sets of products are shown, any amount of images with any amount of sets of products, where each set of products includes any amount of products are within the scope of the present disclosure. As another example, with respect to the example of FIG. 8D, six (6) images of different sets of products are generated by the text-to-image diffusion model based on the textual prompt generated by a language model.

In some embodiments, the textual prompts generated by the language model 704 and/or images generated by the text-to-image diffusion model 710 with sets of products are ranked according to the color consistency score between the products in each of the sets of products through a color consistency scoring model 706. The color consistency scoring model 706 compares the color palettes of products in order to generate a score representing the consistency of the color palettes. For example, with respect to the example of FIG. 4, the color consistency scoring model can extract the color palette from product images of two or more products to generate the color palette vector for each product. The color consistency scoring model can then compute the Euclidian distance between the color palette vectors of the two or more products to compute the color consistency score between the two or more products.

In embodiments, if the color consistency score between the two or more products is higher (e.g., the Euclidian distance between the color palette vectors of the two products are lower), the textual prompt generated by the language model 704 and/or images generated by the text-to-image diffusion model with the two or more products can be ranked higher in the textual prompts generated by the language model 704 and/or images generated by the text-to-image diffusion model in response to the search query (e.g., the textual prompt). Further, in some embodiments, if the color consistency score between the two or more products is lower (e.g., the Euclidian distance between the color palette vectors of the two products are higher), the textual prompt generated by the language model 704 and/or images generated by the text-to-image diffusion model can be filtered (e.g., omitted from being displayed to the customer) or ranked lower in the textual prompts generated by the language model 704 and/or images generated by the text-to-image diffusion model in response to the search query (e.g., the textual prompt).

In some embodiments, the textual prompts generated by the language model 704 and/or images generated by the text-to-image diffusion model 710 with sets of products are ranked according to customer style affinity scores for customer through a customer style affinity scoring model 708. The customer style affinity scoring model 708 is trained to generate style scores for a customer based on input customer data. For example, with respect to the example of FIG. 5, the multi-modal style classification model can be utilized to classify the customer based on the customer data and the style affinity scoring model can generate scores for the customer based on the classification output by the multimodal style classification model. The customer data used to generate the customer style affinity score for a customer can be based on customer data for the customer. For example, with respect to the example of FIG. 5, customer data includes the customer's recent design prompts (e.g., search history), recent purchases, and saved moodboards (e.g., through an API connecting an external moodboard such as Pinterest®, an internal moodboard saved on the website where the customer is performing its search queries, or etc.).

In embodiments, if a style score for the textual prompt generated by the language model 704 and/or images generated by the text-to-image diffusion model 710 is closer to the customer style affinity score for customer, the textual prompt generated by the language model 704 and/or images generated by the text-to-image diffusion model 710 can be ranked higher in the textual prompts generated by the language model 704 and/or images generated by the text-to-image diffusion model 710 in response to the search query (e.g., the textual prompt). Further, in some embodiments, if a style score for the textual prompt generated by the language model 704 and/or images generated by the text-to-image diffusion model 710 is further away from the customer style affinity score for customer, the textual prompt generated by the language model 704 and/or images generated by the text-to-image diffusion model 710 can be filtered (e.g., omitted from being displayed to the customer) or ranked lower in the textual prompts generated by the language model 704 and/or images generated by the text-to-image diffusion model 710 in response to the search query (e.g., the textual prompt).

In some embodiments, the customer style affinity score is updated by the customer style affinity scoring model 708 each time a customer enters the website to perform the search query or at automated intervals in order to capture the evolving style affinities of the customer. In some embodiments, after the language model 704 generates a textual prompt with sets of products based on the knowledge graph, the sets of products are ranked based on specific customer data sources of the customer data. For example, with respect to the example shown in FIG. 8F, sets of products are ranked based on a selected style, recent purchases, moodboards, recent searches, the customer's locations, etc.

In this regard, output 712 of images of sets of products are generated through a text-to-image diffusion model 710 based on the ranked textual prompts generated by the language model 704.

FIGS. 8A-J provide exemplary schematic screenshots from a personal computing device showing aspects of example GUIs, in accordance with embodiments described herein. Aspects of the GUIs depicted in 8A-J may be determined and presented as described in connection with the components of system 200 of FIG. 2. With reference to FIGS. 8A-J, various aspects of exemplary schematic screen displays 800A, 800B, 800C, 800D, 800E, 800F, 800G, 800H, 800I, and 800J are shown, which each can be presented through a display of a computing device, such as user device 102, as discussed above with respect to FIG. 1.

In some embodiments, a GUI can be presented to the customer to interact with the textual prompts generated by the language model during the search query. For example, with respect to the example shown in FIG. 8A-8D, exemplary schematic screen display 800A allows a customer to select a search option (e.g., 802A). Exemplary schematic screen display 800B presents a search query bar (e.g., 802B) in the GUI where a customer can enter text of the search query. As the customer enters text (e.g., "modern minimalistic bathroom with bathtub") in the search query bar of exemplary schematic screen display 800C, the language model generates a number of textual prompts and a customer can select one of the textual prompts (e.g., 802C). In exemplary schematic screen display 800D, a number of images with different sets of products are generated by the text-to-image diffusion model and the customer can select one of the images (e.g., 802D) to view in further detail. In another example, with respect to the example shown in FIG. 8E-8F, exemplary schematic screen display 800E allows a customer to select an element (e.g., inspiration 802E). Exemplary schematic screen display 800F displays a number of images generated by the text-to-image diffusion model based on textual prompts generated by the language model with respect to a selected style (e.g., 802F), recent purchases (e.g., 804F), moodboards (e.g., 806F), recent searches (e.g., 808F), and/or the customer's locations (e.g., 810F). The customer can select an image (e.g., 812F) to view in further detail.

In embodiments, following selection of the image (e.g., 802D or 812F), in exemplary schematic screen display 800G of FIG. 8G, the image is displayed to the end user (e.g., the customer) through the GUI. The products of the set of products of the image are displayed through the GUI (e.g., 802G). As shown in the example, the set of products includes the ceiling pendant, planter, and bathtub. The customer can select the one of the products of the set of products for display in the GUI (e.g., the bathtub). In embodiments, the customer can then indicate (e.g., select or hover over) the bathtub (e.g., 804G) for additional actions.

In embodiments, as shown in exemplary schematic screen display 800H, 800I, and 800J of FIGS. 8G-8I, the GUI can include a number of elements indicating types of requests, such as a request for complementary products, a request for similar products, and/or a request to customize product attributes of the product. In embodiments, upon selection of similar products (802H) in exemplary schematic screen display 800H and the indication of a product in the image (e.g., 804G in FIG. 8G), a list of similar products related to the product type of the product (e.g., 804H) can be generated based on relationships stored in the knowledge graph. For example, 804H shows a number of similar bathtubs (e.g., product type) of a similar color and style in response to the selection of similar products and indication of the bathtub of the set of product of the image. In embodiments, the customer can then select items from the list for review, purchase, and/or perform further requests.

In embodiments, upon selection of complementary products (806H and 802I) in exemplary schematic screen display 800I and the indication of a product in the image (e.g., 804G in FIG. 8G), a list of complementary products (e.g., 804I) can be generated based on relationships stored in the knowledge graph. For example, 804I shows a number of complementary products (e.g., clover wood and glass bath accessories, faux hide bath mat, etc.) of a similar style and/or color in response to the selection of complementary products and indication of the bathtub of the set of product of the image. In embodiments, the customer can then select items from the list for review, purchase, and/or perform further requests.

In embodiments, upon selection of "customize" (806I and 802J) in exemplary schematic screen display 800J and the indication of a product in the image (e.g., 804G in FIG. 8G), a list of product attributes for the product (e.g., 804J) can be generated based on relationships stored in the knowledge graph. For example, with respect to the example of FIG. 8J, the product attributes 804J of the product type (e.g., bathtub) are "type of bath," "tub size," "installation type," "drain placement," and "brand" and can be stored in the knowledge graph with respect to other products of the same product type. In embodiments, the customer can customize the product attributes (e.g., 804J). Based on the changes to the product attributes (e.g., 804J), a list of products with the corresponding different product attributes can be generated based on relationships stored in the knowledge graph. In embodiments, the customer can then select items from the list for review, purchase, and/or perform further requests.

Figure 9:
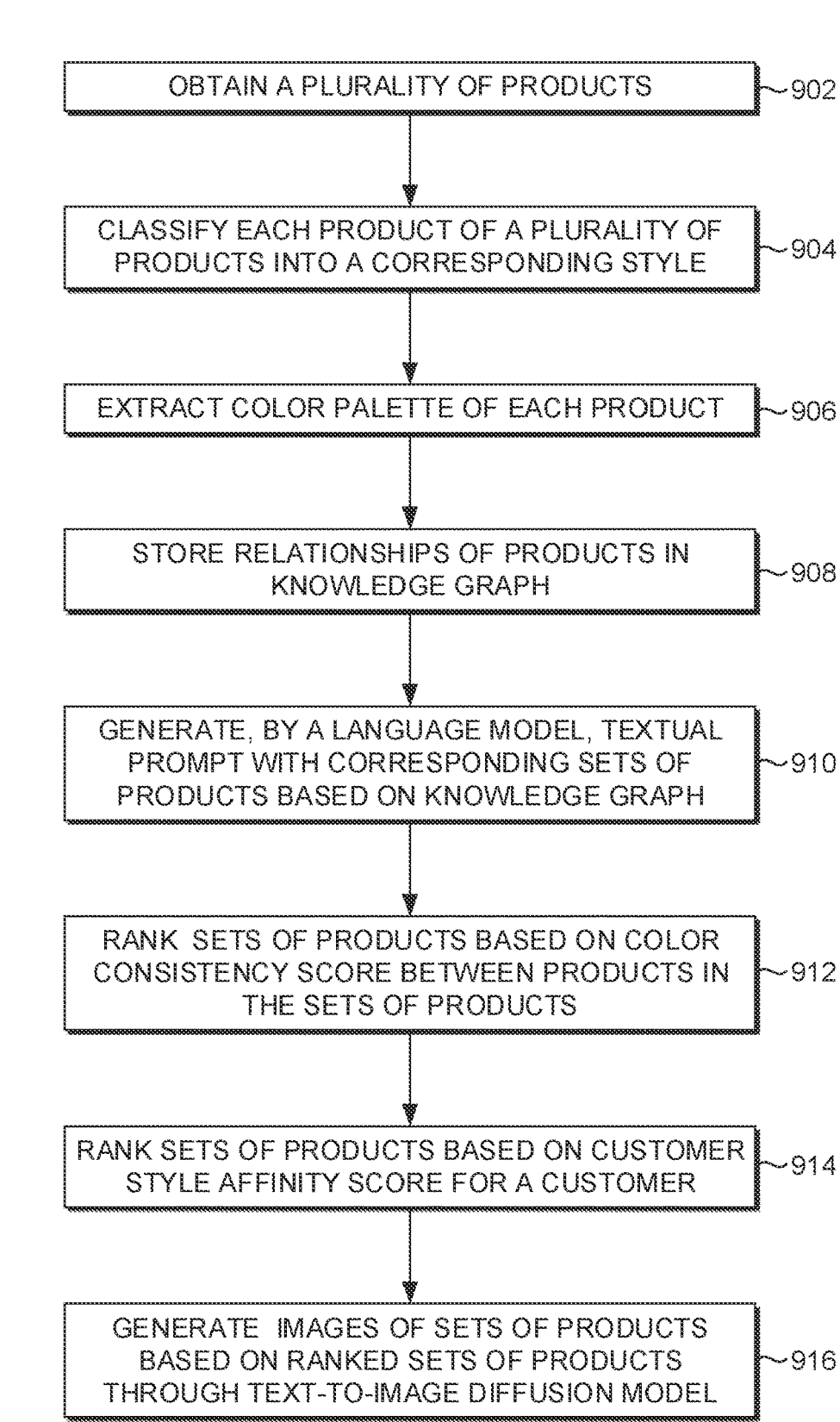
FIG. 9 is a process flow showing a method for using generative AI to optimize product search queries, in accordance with embodiments of the present disclosure.
Figure 11:
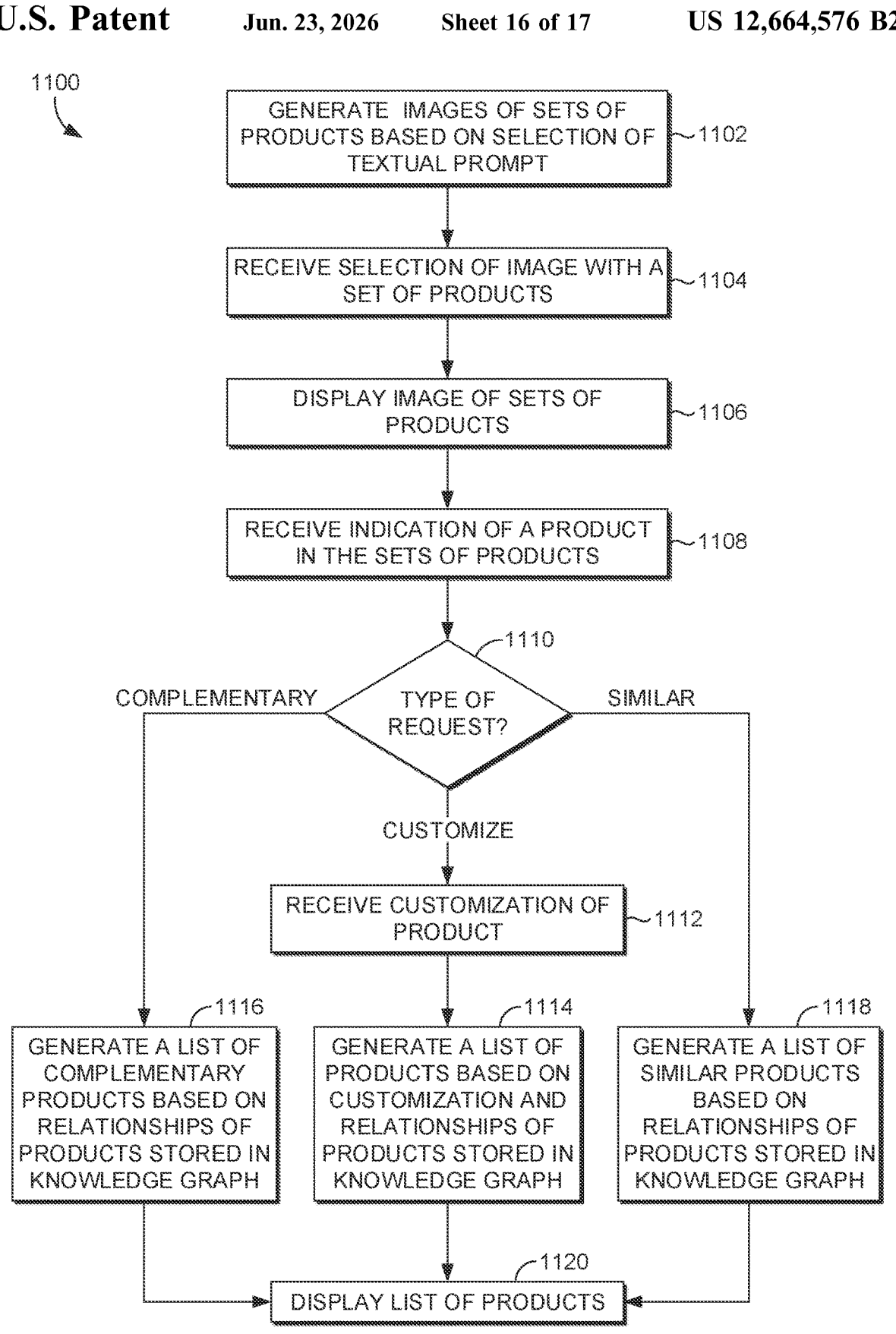
FIG. 11 is a process flow showing another method for using generative AI to optimize product search queries, in accordance with embodiments of the present disclosure.

Exemplary Implementations of Using Generative
AI to Optimize Product Search Queries With reference now to FIGS. 9-11, FIGS. 9-11 provide method flows related to facilitating using generative AI to optimize product search queries, in accordance with embodiments of the present technology. Each block of method 900, 1000 and 1100 comprises a computing process that can be performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few. The method flows of FIGS. 9-11 are exemplary only and not intended to be limiting. As can be appreciated, in some embodiments, method flows 900-1100 can be implemented, at least in part, to facilitate using generative AI to optimize product search queries.

Turning to FIG. 9, a flow diagram 900 is provided showing an embodiment of a method 900 for using generative AI to optimize product search queries, in accordance with embodiments described herein. Initially, at block 902, a plurality of products is obtained, such as a catalog of products from an e-commerce website. The catalog of products can be products offered on a website for customers to purchase. In embodiments, each product in the catalog of products includes a corresponding product description and product image. The product description can include various textual descriptions, such as the title, type of product, how the product is manufacturing, or any other text describing the product.

At block 904, each product of the plurality of products is classified into a corresponding style. For example, with respect to the example of FIG. 3, the styles are "contemporary," "transitional, "modern," "traditional," "eclectic," "minimalist," "mid-century," and "bohemian." In embodiments, the multi-modal style classification model is trained to output a style of unseen, input products. For example, the multi-modal style classification model can be trained based on a training set of products. In one example, with respect to the example of FIG. 3, the multi-modal style classification model is trained based on a training set of home décor products with the corresponding title, description, and images of the training set of home décor products along with their "style" tags (e.g., labels) labelled by interior designers and/or any person or algorithm that is capable of labelling the products with style tags. After the multi-modal style classification model is trained in the example of FIG. 3, the unseen product (e.g., the product description 302A, product title 302B, and product image 302C of the unseen product)

can be input into the multi-modal style classification model to output the corresponding style of the previously unseen product.

At block 906, the color palette of each product of the plurality of products is extracted. The color palette extracted for each product can be any number of colors of the product and in any form, such as vectors corresponding to the colors of the color palette extracted from the product image(s) of the product. For example, with respect to the example of FIG. 6, each product includes the three main colors (e.g., most prominent colors) of each product represented by the respective hexadecimal color code of the color.

At block 908, the relationships of the products of the plurality of products is stored in a knowledge graph. As a specific example of relationships that can be stored in a knowledge graph, with respect to the example of FIG. 6, the knowledge graph captures relationships, such as (a) room type (e.g., a subset of complimentary products) and style associations, (b) room type (e.g., a subset of complimentary products) and furniture (e.g., a type of product) associations, (c) furniture (e.g., a type of product) and color associations, and (d) color consistency scores between two products (e.g., as shown by example stock keeping units (SKUs) of each product) in the catalog of products. In one example, relationships regarding the colors and/or color palettes of products can be stored in the knowledge graph. For example, with respect to the example of FIG. 6, the relationship of each product (e.g., each SKU) to its corresponding color palette is stored in the knowledge graph. In another example, relationships regarding the style of products can be stored in the knowledge graph. For example, with respect to the example of FIG. 6, the relationship of each product (e.g., each SKU) to its corresponding style (e.g., contemporary) is stored in the knowledge graph. Also with respect to the example of FIG. 6, the relationship between the style (e.g., "contemporary") and the subset of complimentary products (e.g., "living room") can be stored in the knowledge graph. In another example, relationships regarding product type of products can be stored in the knowledge graph. For example, as described with respect to the example of FIG. 6, the relationship of the product (e.g., each SKU) to its corresponding type of product (e.g., sectional couch, rug, or coffee table). In another example, relationships regarding product attributes of products can be stored in the knowledge graph. For example, with respect to the example of FIG. 8J, the product attributes of the product type (e.g., bathtub) are "type of bath," "tub size," "installation type," "drain placement," and "brand" and can be stored in the knowledge graph with respect to other products of the same product type. In another example, relationships regarding subsets of complementary products can be stored in the knowledge graph. For example, with respect to the example of FIG. 6, the relationship between products types (e.g., "coffee table," a "rug," and a "sectional couch") and the subset of complimentary products (e.g., "living room") is stored in the knowledge graph. As can be understood, any relationships regarding the products of the product catalog can be stored in the knowledge graph.

At block 910, one or more textual prompts with corresponding sets of products are generated by a language model based on the relationships of the products stored in the knowledge graph. In embodiments, the language model can be trained based on the relationships stored in the knowledge graph to generate textual prompts in human-readable text for display to an end user (e.g., a customer). For example, with respect to the example of FIG. 7 and example knowledge graph of FIG. 6, a pre-trained language generation model, leverages the relationships stored in the knowledge graph, such as room type, room style, furniture type and furniture color, to generate logical and human readable textual prompts as output for each combination of room type, room style, furniture type, and/or furniture color (e.g., the example of FIG. 8B, language model generates the textual prompt of "modern minimalistic bathroom with bathtub, windows, plants, and wooden floor"). In this regard, the textual prompt generated by the language model can be utilized to guide the output of the text-to-image diffusion model as the language model is trained based on the relationships between products as stored in the knowledge graph.

Further, in some embodiments, any input (e.g., text or images, customer data, etc.) can be utilized to guide the output textual prompt of the language model. For example, with respect to the example of FIGS. 8B and 8C, the customer may begin by inputting text and/or image(s) (e.g., the customer inputs "modern minimalistic bathroom with bathtub") into the search query and the language model generates textual prompts (e.g., "modern minimalistic bathroom with bathtub and wooden floor," "modern minimalistic bathroom with bathtub, windows, plants, and wooden floor," etc.) based on the input from the customer. In some embodiments, an image-to-text diffusion model can generate text from input images in order to input images as search queries to guide the language model in generating textual prompts. In other embodiments, the language model can begin by generating a textual prompt, the customer can refine the textual prompt through input text or images, and the language model can refine the textual prompt based on the customer's input.

In some embodiments, with respect to the example shown in FIG. 8F, the language model can generate the textual prompt based on a selected style, recent purchases, moodboards, recent searches, the customer's locations, the customer style affinity score, etc. In this regard, customer data can be used to generate personalized textual prompts by the language model. In some embodiments, customer data can be used to determine products affinity scores, complementary product affinity scores, color affinity scores, and other scores to generate personalized textual prompts by the language model.

At block 912, the sets of products of the textual prompts are ranked based on a color consistency score generated between the products in the sets of products. In some embodiments, the textual prompts generated by the language model and/or images generated by the text-to-image diffusion model with sets of products are ranked according to the color consistency score between the products in each of the sets of products. The color consistency scoring model compares the color palettes of products in order to generate a score representing the consistency of the color palettes. For example, with respect to the example of FIG. 4, the color consistency scoring model can extract the color palette from product images of two or more products to generate the color palette vector for each product. The color consistency scoring model can then compute the Euclidian distance between the color palette vectors of the two or more products to compute the color consistency score between the two or more products.

In embodiments, if the color consistency score between the two or more products is higher (e.g., the Euclidian distance between the color palette vectors of the two products are lower), the textual prompt generated by the language model and/or images generated by the text-to-image diffusion model with the two or more products can be ranked higher in the textual prompts generated by the language model and/or images generated by the text-to-image diffusion model in response to the search query (e.g., the textual prompt). Further, in some embodiments, if the color consistency score between the two or more products is lower (e.g., the Euclidian distance between the color palette vectors of the two products are higher), the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt At block 914, the sets of products of the textual prompts are ranked based on a customer style affinity score for a customer performing the search. In some embodiments, the textual prompts generated by the language model and/or images generated by the text-to-image diffusion model with sets of products are ranked according to customer style affinity scores for customer. The customer style affinity scoring model is trained to generate style scores for a customer based on input customer data. For example, with respect to the example of FIG. 5, the multi-modal style classification model can be utilized to classify the customer based on the customer data and the style affinity scoring model can generate scores for the customer based on the classification output by the multi-modal style classification model. The customer data used to generate the customer style affinity score for a customer can be based on customer data for the customer. For example, with respect to the example of FIG. 5, customer data includes the customer's recent design prompts (e.g., search history), recent purchases, and saved moodboards (e.g., through an API connecting an external moodboard such as Pinterest®, an internal moodboard saved on the website where the customer is performing its search queries, or etc.).

In embodiments, if a style score for the textual prompt generated by the language model and/or images generated by the text-to-image diffusion model is closer to the customer style affinity score for customer, the textual prompt generated by the language model and/or images generated by the text-to-image diffusion model can be ranked higher in the textual prompts generated by the language model and/or images generated by the text-to-image diffusion model in response to the search query (e.g., the textual prompt). Further, in some embodiments, if a style score for the textual prompt generated by the language model and/or images generated by the text-to-image diffusion model is further away from the customer style affinity score for customer, the textual prompt generated by the language model and/or images generated by the text-to-image diffusion model can be filtered (e.g., omitted from being displayed to the customer) or ranked lower in the textual prompts generated by the language model and/or images generated by the text-to-image diffusion model in response to the search query (e.g., the textual prompt).

In some embodiments, the customer style affinity score is updated each time a customer enters the website to perform the search query or at automated intervals in order to capture the evolving style affinities of the customer. In some embodiments, after the language model generates a textual prompt with sets of products based on the knowledge graph, the sets of products are ranked based on specific customer data sources of the customer data. For example, with respect to the example shown in FIG. 8F, sets of products are ranked based on a selected style, recent purchases, moodboards, recent searches, the customer's locations, etc.

At block 916, images with the corresponding sets of products are generated by a text-to-image diffusion model based on the corresponding ranking of the set of products. In this regard, an image (or images) of a set of products (or sets of products) are generated through a text-to-image diffusion model based on the textual prompt generated by the language model. For example, with respect to the example of FIG. 7, the text-to-image diffusion model generates three (3) images of different sets of products, where each set of products includes a number of products from the catalog of products, based on the textual prompt generated by a language model. Although three (3) images of different sets of products are shown, any amount of images with any amount of sets of products, where each set of products includes any amount of products are within the scope of the present disclosure. As another example, with respect to the example of FIG. 8D, six (6) images of different sets of products are generated by the text-to-image diffusion model based on the textual prompt generated by a language model.

Turning now to FIG. 10, a flow diagram 1000 is provided showing an embodiment of a method 1000 for using generative AI to optimize product search queries, in accordance with embodiments described herein. Initially, at block 1002, text or an image is received as search query from a customer. For example, with respect to the example of FIGS. 8B and 8C, the customer may begin by inputting text and/or image (s) (e.g., the customer inputs "modern minimalistic bathroom with bathtub") into the search query and the language model generates textual prompts (e.g., "modern minimalistic bathroom with bathtub and wooden floor," "modern minimalistic bathroom with bathtub, windows, plants, and wooden floor," etc.) based on the input from the customer. In some embodiments, an image-to-text diffusion model can generate text from input images in order to input images as search queries to guide the language model in generating textual prompts. In other embodiments, the language model can begin by generating a textual prompt, the customer can refine the textual prompt through input text or images, and the language model can refine the textual prompt based on the customer's input.

At block 1004, one or more textual prompts with corresponding sets of products are generated by a language model based on the relationships of the products stored in the knowledge graph. At block 1006, the sets of products of the textual prompts are ranked based on a color consistency score generated between the products in the sets of products. At block 1008, the sets of products of the textual prompts are ranked based on a customer style affinity score for a customer performing the search. At block 1010, the sets of textual prompts are displayed based on the corresponding ranking of the sets of products within each of the textual prompts. In this regard, an image (or images) of a set of products (or sets of products) are generated through a text-to-image diffusion model based on the ranked textual prompts generated by the language model.

At block 1012, the customer selects one of the textual prompts. In some embodiments, a GUI can be presented to the customer to interact with the textual prompts generated by the language model during the search query. For example, with respect to the example shown in FIG. 8A-8D, exemplary schematic screen display 800A allows a customer to select a search option (e.g., 802A). Exemplary schematic screen display 800B presents a search query bar (e.g., 802B) in the GUI where a customer can enter text of the search query. As the customer enters text (e.g., "modern minimalistic bathroom with bathtub") in the search query bar of exemplary schematic screen display 800C, the language model generates a number of textual prompts and a customer can select one of the textual prompts (e.g., 802C). In exemplary schematic screen display 800D, a number of images with different sets of products are generated by the text-to-image diffusion model and the customer can select one of the images (e.g., 802D) to view in further detail. In another example, with respect to the example shown in FIG. 8E-8F, exemplary schematic screen display 800E allows a customer to select an element (e.g., inspiration 802E). Exemplary schematic screen display 800F displays a number of images generated by the text-to-image diffusion model based on textual prompts generated by the language model with respect to a selected style (e.g., 802F), recent purchases (e.g., 804F), moodboards (e.g., 806F), recent searches (e.g., 808F), and/or the customer's locations (e.g., 810F). The customer can select an image (e.g., 812F) to view in further detail.

At block 1014, images with the corresponding sets of products are generated by a text-to-image diffusion model based on the selected textual prompt. In embodiments, following selection of the image (e.g., 802D or 812F), in exemplary schematic screen display 800G of FIG. 8G, the image is displayed to the end user (e.g., a customer) through the GUI. The products of the set of products of the image are displayed through the GUI (e.g., 802G). As shown in the example, the set of products includes the ceiling pendant, planter, and bathtub. The customer can select the one of the products of the set of products for display in the GUI (e.g., the bathtub). In embodiments, the customer can then indicate (e.g., select or hover over) the bathtub (e.g., 804G) for additional actions.

Turning now to FIG. 11, a flow diagram 1100 is provided showing an embodiment of a method 1100 for using generative AI to optimize product search queries, in accordance with embodiments described herein. Initially, at block 1102, images with the corresponding sets of products are generated by a text-to-image diffusion model based on the selected textual prompt generated by a language model based on relationships of products stored in a knowledge graph. At block 1104, the customer selects one of the images with a corresponding set of products within the image. At block 1106, the selected images with the corresponding set of products is displayed for the customer.

At block 1108, the customer indicates one of the products in the set of products. In embodiments, following selection of the image (e.g., 802D or 812F), in exemplary schematic screen display 800G of FIG. 8G, the image is displayed to the end user (e.g., a customer) through the GUI. The products of the set of products of the image are displayed through the GUI (e.g., 802G). As shown in the example, the set of products includes the ceiling pendant, planter, and bathtub. The customer can select the one of the products of the set of products for display in the GUI (e.g., the bathtub). In embodiments, the customer can then indicate (e.g., select or hover over) the bathtub (e.g., 804G) for additional actions.

At block 1110, in addition to indicating one of the products in the set of products, the customer selects a type of request. In embodiments, as shown in exemplary schematic screen display 800H, 800I, and 800J of FIGS. 8G-8I, the GUI can include a number of elements indicating types of requests, such as a request for complementary products, a request for similar products, and/or a request to customize product attributes of the product.

At block 1112, for a type of request to customize a product, the customer changes a product attribute of the product to customize the product. At block 1114, a list of products is generated with the customization to the product attribute of the product based on the relationships between each of the products as stored in the knowledge graph. In embodiments, upon selection of "customize" (806I and 802J) in exemplary schematic screen display 800J and the indication of a product in the image (e.g., 804G in FIG. 8G), a list of product attributes for the product (e.g., 804J) can be generated based on relationships stored in the knowledge graph. For example, with respect to the example of FIG. 8J, the product attributes 804J of the product type (e.g., bathtub) are "type of bath," "tub size," "installation type," "drain placement," and "brand" and can be stored in the knowledge graph with respect to other products of the same product type. In embodiments, the customer can customize the product attributes (e.g., 804J). Based on the changes to the product attributes (e.g., 804J), a list of products with the corresponding different product attributes can be generated based on relationships stored in the knowledge graph (e.g., block 1120).

At block 1116, for a type of request for complimentary products, a list of complimentary products is generated based on the relationships between each of the products as stored in the knowledge graph. In embodiments, upon selection of complimentary products (806H and 802I) in exemplary schematic screen display 800I and the indication of a product in the image (e.g., 804G in FIG. 8G), a list of complimentary products (e.g., 804I) can be generated based on relationships stored in the knowledge graph (e.g., block 1120). For example, 804I shows a number of complimentary products (e.g., clover wood and glass bath accessories, faux hide bath mat, etc.) of a similar style and/or color in response to the selection of complimentary products and indication of the bathtub of the set of product of the image.

At block 1118, for a type of request for similar products, a list of similar products is generated based on the relationships between each of the products as stored in the knowledge graph. In embodiments, upon selection of similar products (802H) in exemplary schematic screen display 800H and the indication of a product in the image (e.g., 804G in FIG. 8G), a list of similar products related to the product type of the product (e.g., 804H) can be generated based on relationships stored in the knowledge graph (e.g., block 1120). For example, 804H shows a number of similar bathtubs (e.g., product type) of a similar color and style in response to the selection of similar products and indication of the bathtub of the set of product of the image.

At block 1120, (1) the list of similar products based on the customization of the product attribute of the product, (2) the list of complimentary products, and/or (3) the list of similar products is generated and displayed to the end user. In embodiments, the customer can then select items from the list for review, purchase, and/or perform further requests Overview of Exemplary Operating Environment Having briefly described an overview of aspects of the technology described herein, an exemplary operating environment in which aspects of the technology described herein may be implemented is described below in order to provide a general context for various aspects of the technology described herein.

Figure 12:
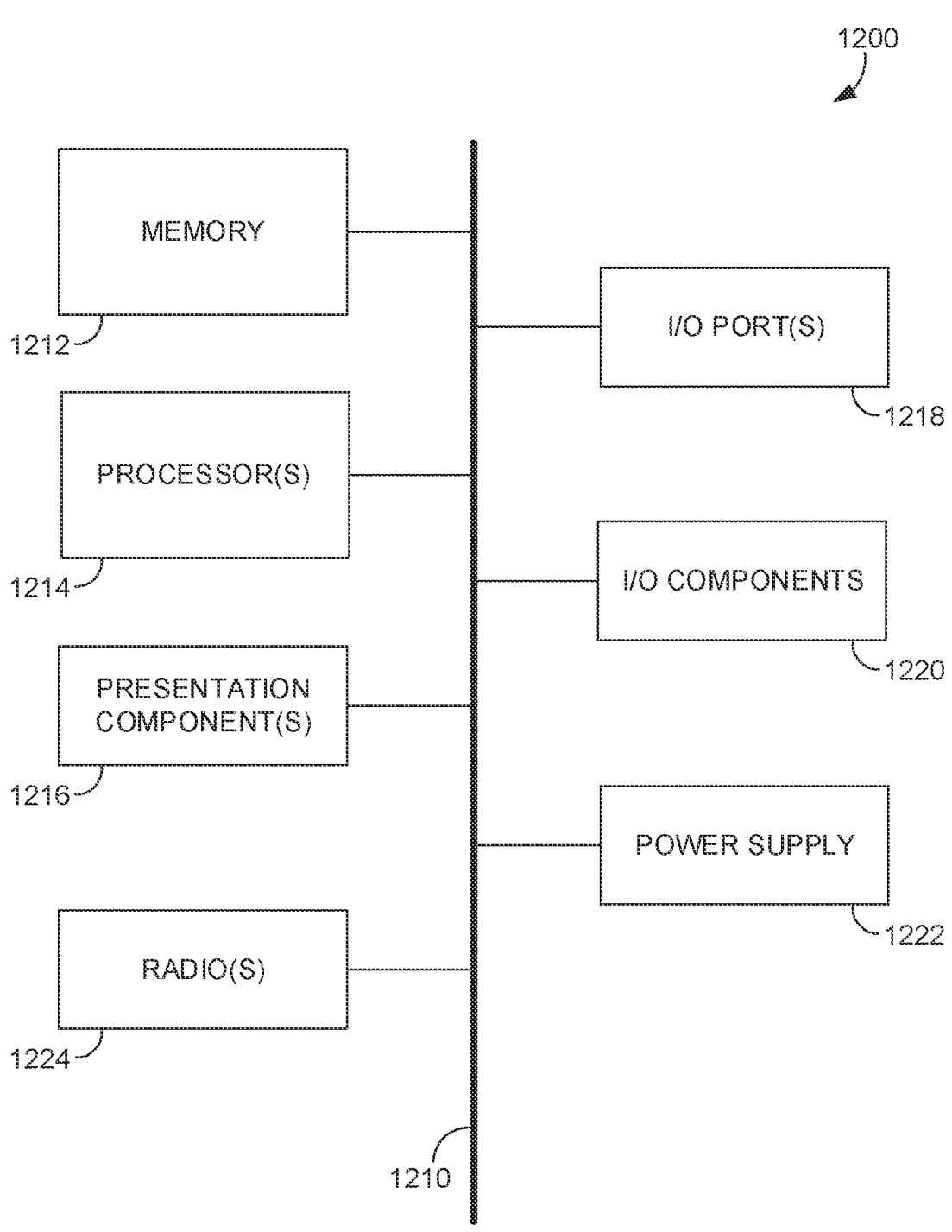
FIG. 12 is a block diagram of an example computing device in which embodiments of the present disclosure can be employed.

Referring to the drawings in general, and initially to FIG. 12 in particular, an exemplary operating environment for implementing aspects of the technology described herein is shown and designated generally as computing device 1200. Computing device 1200 is just one example of a suitable computing environment and is not intended to suggest any limitation as to the scope of use or functionality of the technology described herein. Neither should the computing device 1200 be interpreted as having any dependency or requirement relating to any one or combination of components illustrated.

The technology described herein may be described in the general context of computer code or machine-usable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the technology described herein may be practiced in a variety of system configurations, including handheld devices, consumer electronics, general-purpose computers, and specialty computing devices. Aspects of the technology described herein may also be practiced in distributed computing environments where tasks are performed by remote-processing devices that are linked through a communications network.

With continued reference to FIG. 12, computing device 1200 includes a bus 1210 that directly or indirectly couples the following devices: memory 1212, one or more processors 1214, one or more presentation components 1216, input/output (I/O) ports 1218, I/O components 1220, an illustrative power supply 1222, and a radio(s) 1224. Bus 1210 represents what may be one or more busses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 12 is merely illustrative of an exemplary computing device that can be used in connection with one or more aspects of the technology described herein. Distinction is not made between such categories as "workstation," "server," "laptop," and "handheld device," as all are contemplated within the scope of FIG. 12 and refer to "computer" or "computing device."

Computing device 1200 typically includes a variety of computer-readable media. Computer-readable media can be any available media that can be accessed by computing device 1200 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program sub-modules, or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage, or other magnetic storage devices. Computer storage media does not comprise a propagated data signal.

Communication media typically embodies computer-readable instructions, data structures, program sub-modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1212 includes computer storage media in the form of volatile and/or nonvolatile memory. The memory 1212 may be removable, non-removable, or a combination thereof. Exemplary memory includes solid-state memory, hard drives, and optical-disc drives. Computing device 1200 includes one or more processors 1214 that read data from various entities such as bus 1210, memory 1212, or I/O components 1220. Presentation component(s) 1216 present data indications to a user or other device. Exemplary presentation components 1216 include a display device, speaker, printing component, and vibrating component. I/O port(s) 1218 allow computing device 1200 to be logically coupled to other devices including I/O components 1220, some of which may be built in.

Illustrative I/O components include a microphone, joystick, game pad, satellite dish, scanner, printer, display device, wireless device, a controller (such as a keyboard, and a mouse), a natural user interface (NUI) (such as touch interaction, pen (or stylus) gesture, and gaze detection), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1214 may be direct or via a coupling utilizing a serial port, parallel port, and/or other interface and/or system bus known in the art. Furthermore, the digitizer input component may be a component separated from an output component such as a display device, or in some aspects, the usable input area of a digitizer may be coextensive with the display area of a display device, integrated with the display device, or may exist as a separate device overlaying or otherwise appended to a display device. Any and all such variations, and any combination thereof, are contemplated to be within the scope of aspects of the technology described herein.

A NUI processes air gestures, voice, or other physiological inputs generated by a user. Appropriate NUI inputs may be interpreted as ink strokes for presentation in association with the computing device 1200. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 1200. The computing device 1200 may be equipped with depth cameras, such as stereoscopic camera systems, infrared camera systems, RGB camera systems, and combinations of these, for gesture detection and recognition. Additionally, the computing device 1200 may be equipped with accelerometers or gyroscopes that enable detection of motion. The output of the accelerometers or gyroscopes may be provided to the display of the computing device 1200 to render immersive augmented reality or virtual reality.

A computing device may include radio(s) 1224. The radio 1224 transmits and receives radio communications. The computing device may be a wireless terminal adapted to receive communications and media over various wireless networks. Computing device 1200 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is a second example of a short-range connection. A long-range connection may include a connection using one or more of CDMA, GPRS, GSM, TDMA, and 802.16 protocols.

The technology described herein is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

What is claimed is:

1. A computer-implemented method comprising:

obtaining a plurality of product representations for a plurality of products, each product representation of each product of the plurality of products comprising a corresponding product description and a corresponding product image of each product;

classifying, by a multi-modal style classification model, each product of the plurality of products into a corresponding style of a plurality of styles based on the corresponding product description and the corresponding product image of each product, wherein the multi-modal style classification model is a machine learning model trained to output styles using input sentence encodings and image feature vectors;

storing, in a knowledge graph, relationships of each product of the plurality of products to other products in the plurality of products based on the corresponding style of each product and at least a portion of the corresponding product description of each product; and responsive to input selecting a search option from a user interface (UI), communicating a diffusion-generated image that includes a set of products from the plurality of products to display the diffusion-generated image via the UI by:

determining the set of products for a particular style of the diffusion-generated image by instructing a language model to output the set of products for the particular style based on the relationships in the knowledge graph;

after determining the set of products for the particular style, computing, by a color consistency scoring model configured to compute vectors from color palettes of images, an Euclidian distance between color palette vectors associated with a first product and a second product of the set of products; and generating, by prompting a text-to-image diffusion model with each corresponding product image of each product of the set of products and instructions to generate the diffusion-generated image that includes the set of products, the diffusion-generated image for display only when the Euclidian distance between the color palette vectors is within a threshold color consistency score.

2. The computer-implemented method of claim 1, further comprising:

obtaining a plurality of subsets of complementary products, each product of the plurality of products within a corresponding subset of complementary products of the plurality of subsets of complementary products based on a corresponding type of each product in the corresponding product description of each product; and storing, in the knowledge graph, the relationships of each product of the plurality of products to the other products in the plurality of products further based on a first association of the corresponding type of each product with the corresponding subset of complementary products and a second association of the corresponding style of each product with the corresponding subset of complementary products.

3. The computer-implemented method of claim 1, further comprising:

extracting, by a color palette extraction engine, a corresponding color palette for each product of the plurality of products based on the corresponding product image of each product;

storing, in the knowledge graph, the corresponding color palette of each product of the plurality of products;

computing, by the color consistency scoring model, a corresponding color consistency score between each pair of products of the plurality of products; and determining, by the language model, the set of products further based on the corresponding color consistency score between each pair of products of the set of products.

4. The computer-implemented method of claim 1, further comprising:

generating, by the language model, a suggested textual prompt based on the relationships of each product of the plurality of products to the other products of the plurality of products, the suggested textual prompt comprising at least one of a corresponding product type, a corresponding color of the corresponding product type, a corresponding subset of complementary products, and the corresponding style; and generating, by the text-to-image diffusion model, the diffusion-generated image that includes the set of products of the plurality of products further based on the suggested textual prompt.

5. The computer-implemented method of claim 1, further comprising:

obtaining customer data of a customer, the customer data comprising at least one of images saved by the customer, purchases by the customer, and search queries of the customer;

determining, by a style affinity scoring model, a customer style affinity score for the customer based on the customer data of the customer; and determining, by the language model, the set of products further based on the customer style affinity score of the customer.

6. The computer-implemented method of claim 1, wherein the multi-modal style classification model is a deep learning model trained based on training products, wherein each of the training products comprise a product description, a product image, and a labeled style of the plurality of styles.

7. The computer-implemented method of claim 1, wherein the multi-modal style classification model receives an input vector comprising a product description sentence encoding based on a product description, a product title sentence encoding based on the product description, and a product image feature set generated from a convolutional neural network based on the corresponding product image to classify each product into the corresponding style.

8. One or more non-transitory computer-readable media having a plurality of executable instructions embodied thereon, which, when executed by one or more processors, cause the one or more processors to perform a method comprising:

obtaining a plurality of product representations for a plurality of products, each product representation of each product of the plurality of products comprising a corresponding product description and a corresponding product image of each product;

classifying, by a multi-modal style classification model, each product of the plurality of products into a corresponding style of a plurality of styles based on the corresponding product description and the corresponding product image of each product, wherein the multi-modal style classification model is a machine learning model trained to output styles using input sentence encodings and image feature vectors;

storing, in a knowledge graph, relationships of each product of the plurality of products to other products in the plurality of products based on the corresponding style of each product and at least a portion of the corresponding product description of each product; and responsive to input selecting a search option from a user interface (UI), communicating a suggested textual prompt comprising a textual description of a set of products from the plurality of products and a diffusion-generated image that includes the set of products from the plurality of products to display the suggested textual prompt and the diffusion-generated image via the UI by:

determining the set of products for a particular style of the suggested textual prompt and the diffusion-generated image by instructing a language model to output the set of products for the particular style based on the relationships in the knowledge graph;

after determining the set of products for the particular style, computing, by a color consistency scoring model configured to compute vectors from color palettes of images, an Euclidian distance between color palette vectors associated with a first product and a second product of the set of products;

generating, by prompting the language model, the suggested textual prompt for display only when the Euclidian distance between the color palette vectors is within a threshold color consistency score; and generating, by prompting a text-to-image diffusion model with each corresponding product image of each product of the set of products and instructions to generate the diffusion-generated image that includes the set of products, the diffusion-generated image for display only when the Euclidian distance between the color palette vectors is within the threshold color consistency score.

9. The one or more non-transitory computer-readable media of claim 8, wherein the method further comprises:

obtaining a plurality of subsets of complementary products, each product of the plurality of products within a corresponding subset of complementary products of the plurality of subsets of complementary products based on a corresponding type of each product in the corresponding product description of each product; and storing, in the knowledge graph, the relationships of each product of the plurality of products to the other products in the plurality of products further based on a first association of the corresponding type of each product with the corresponding subset of complementary products and a second association of the corresponding style of each product with the corresponding subset of complementary products.

10. The one or more non-transitory computer-readable media of claim 8, wherein the method further comprises:

extracting, by a color palette extraction engine, a corresponding color palette for each product of the plurality of products based on the corresponding product image of each product;

storing, in the knowledge graph, the corresponding color palette of each product of the plurality of products;

computing, by the color consistency scoring model, a corresponding color consistency score between each pair of products of the plurality of products; and determining, by the language model, the set of products further based on the corresponding color consistency score between each pair of products of the set of products.

11. The one or more non-transitory computer-readable media of claim 8, wherein the method further comprises:

generating, by prompting the text-to-image diffusion model with each corresponding product image of each product of the set of products and instructions to generate the diffusion-generated image that includes the set of products further based on the suggested textual prompt.

12. The one or more non-transitory computer-readable media of claim 8, wherein the method further comprises:

obtaining customer data of a customer, the customer data comprising at least one of images saved by the customer, purchases by the customer, and search queries of the customer;

determining, by a style affinity scoring model, a customer style affinity score for the customer based on the customer data of the customer; and determining, by the language model, the set of products further based on the customer style affinity score of the customer.

13. The one or more non-transitory computer-readable media of claim 8, wherein the method further comprises:

receiving a search query comprising at least one of an image or text; and determining, by the language model, the set of products further based on the search query.

14. A computing system comprising:

a processor; and a non-transitory computer-readable medium having stored thereon instructions that when executed by the processor, cause the processor to perform operations including:

obtaining a plurality of product representations for a plurality of products, each product representation of each product of the plurality of products comprising a corresponding product description and a corresponding product image of each product;

obtaining a plurality of subsets of complementary products, each product of the plurality of products within a corresponding subset of complementary products of the plurality of subsets of complementary products based on a corresponding product type of each product in the corresponding product description of each product;

classifying, by a multi-modal style classification model, each product of the plurality of products into a corresponding style of a plurality of styles based on the corresponding product description and the corresponding product image of each product, wherein the multi-modal style classification model is a machine learning model trained to output styles using input sentence encodings and image feature vectors;

storing, in a knowledge graph, relationships of each product of the plurality of products to other products in the plurality of products based on a first association of the corresponding product type of each product with the corresponding subset of complementary products and a second association of the corresponding style of each product with the corresponding subset of complementary products;

responsive to input selecting a search option from a user interface (UI), communicating a diffusion-generated image that includes a set of products from the plurality of products to display the diffusion-generated image on the UI by:

determining the set of products for a particular style of the diffusion-generated image by instructing a language model to output the set of products for the particular style based on the relationships in the knowledge graph;

after determining the set of products for the particular style, computing, by a color consistency scoring model configured to compute vectors from color palettes of images, an Euclidian distance between color palette vectors of at least two products of the set of products; and generating, by prompting a text-to-image diffusion model with each corresponding product image of each product of the set of products and instructions to generate the diffusion-generated image that includes the set of products, the diffusion-generated image for display only when the Euclidian distance between the color palette vectors is within a threshold color consistency score; and responsive to an indication of a product in the set of products of the diffusion-generated image, communicating a set of different products for display based on a relationship of the product in the set of products to the set of different products.

15. The computing system of claim 14, wherein the indication is at least one of a hover action or a selection action.

16. The computing system of claim 14, wherein the set of different products is based on at least one of the corresponding product type or the corresponding subset of complementary products of the product in the set of products of the diffusion-generated image.

17. The computing system of claim 14, wherein responsive to the indication of the product in the set of products of the diffusion-generated image communicating the set of different products for display further comprises:

receiving the indication of the product in the set of products of the diffusion-generated image;

generating a set of products attributes of the product;

receiving a selection of a change to a product attribute of the set of products attributes of the product; and generating the set of different products further based on the change to the product attribute.

18. The computing system of claim 14, the operations further including:

extracting, by a color palette extraction engine, a corresponding color palette for each product of the plurality of products based on the corresponding product image of each product;

storing, in the knowledge graph, the corresponding color palette of each product of the plurality of products;

computing, by the color consistency scoring model, a corresponding color consistency score between each pair of products of the plurality of products;

determining, by the language model, the set of products further based on the corresponding color consistency score between each pair of products of the set of products; and responsive to receiving a further indication for a different color of the product, communicating the set of different products for display based on the different color.

19. The computing system of claim 14, the operations further including:

generating, by the language model, a suggested textual prompt based on the relationships of each product of the plurality of products to the other products of the plurality of products, the suggested textual prompt comprising at least one of the corresponding product type, a corresponding color of the corresponding product type, the corresponding subset of complementary products, and the corresponding style; and generating, by the text-to-image diffusion model, the diffusion-generated image that includes the set of products of the plurality of products further based on the suggested textual prompt.

20. The computing system of claim 14, the operations further including:

obtaining customer data of a customer, the customer data comprising at least one of images saved by the customer, purchases by the customer, and search queries of the customer;

determining, by a style affinity scoring model, a customer style affinity score for the customer based on the customer data of the customer; and determining, by the language model, the set of products further based on the customer style affinity score of the customer.

\* \* \* \* \*